US011863035B2

(12) United States Patent
Eilenberger

(10) Patent No.: US 11,863,035 B2
(45) Date of Patent: Jan. 2, 2024

(54) STATOR FOR AN ELECTRICAL MACHINE

(71) Applicant: Miba eMobility GmbH, Laakirchen (AT)

(72) Inventor: Andreas Eilenberger, Lengenfeld (AT)

(73) Assignee: Miba eMobility GmbH, Laakirchen (AT)

(*) Notice: Subject to any disclaimer, the term of this patent is extended or adjusted under 35 U.S.C. 154(b) by 498 days.

(21) Appl. No.: 17/265,585

(22) PCT Filed: Aug. 27, 2019

(86) PCT No.: PCT/AT2019/060275
§ 371 (c)(1),
(2) Date: Feb. 3, 2021

(87) PCT Pub. No.: WO2020/047568
PCT Pub. Date: Mar. 12, 2020

(65) Prior Publication Data
US 2021/0296956 A1    Sep. 23, 2021

(30) Foreign Application Priority Data

Sep. 5, 2018 (AT) .............................. A 50756/2018
Nov. 30, 2018 (AT) .............................. A 51063/2018

(51) Int. Cl.
*H02K 3/28* (2006.01)
*H02K 1/16* (2006.01)
(Continued)

(52) U.S. Cl.
CPC ................. *H02K 3/28* (2013.01); *H02K 1/16* (2013.01); *H02K 3/14* (2013.01); *H02K 3/48* (2013.01); *H02K 2213/03* (2013.01)

(58) Field of Classification Search
CPC ........ H02K 1/16; H02K 2213/03; H02K 3/14; H02K 3/28; H02K 3/48
See application file for complete search history.

(56) References Cited

U.S. PATENT DOCUMENTS 3,152,273 A * 10/1964 Harrington ............... H02K 3/28
                                                            310/198
3,201,627 A *  8/1965 Harrington ............... H02K 3/28
                                                            310/198
(Continued)

FOREIGN PATENT DOCUMENTS

DE    20 2016 001 273 U1    3/2016
EP           0 975 082 A2    1/2000
(Continued)

OTHER PUBLICATIONS

JP-2014217136-A, Goto et al., all pages (Year: 2014).*
(Continued)

*Primary Examiner* — Naishadh N Desai
(74) *Attorney, Agent, or Firm* — Collard & Roe, P.C.

(57) ABSTRACT

The invention relates to a stator (1) for an electric machine, comprising an essentially hollow-cylindrical laminated core (2) with multiple receiving grooves (4) which are arranged distributed. Multiple electric conductor sections (La, Lb) per receiving groove (4) formed by forming rods form a stator winding (14) with at least two part-windings (TWa, TWb). The at least two electric part-windings (TWa, TWb) are respectively formed by at least one first and one second electrically series-connected winding segment (WSa, WSb), wherein conductor sections (La, Lb) of the first winding segment (WSa) are electrically interconnected by means of first and second electric connecting sections (VBa, VBb) such that a helical current path (17a) is defined along a first radial direction (18a) to the longitudinal axis (3) of the laminated core (2) and conductor sections (La, Lb) of the second winding segment (WSb) are electrically interconnected by means of first and second electric connecting sections (VB a, VBb) such that a second helical current path (17b) is defined along an opposite, second radial direction (18b) to the longitudinal axis (3) of the laminated core (2).

27 Claims, 11 Drawing Sheets

Figure 6:
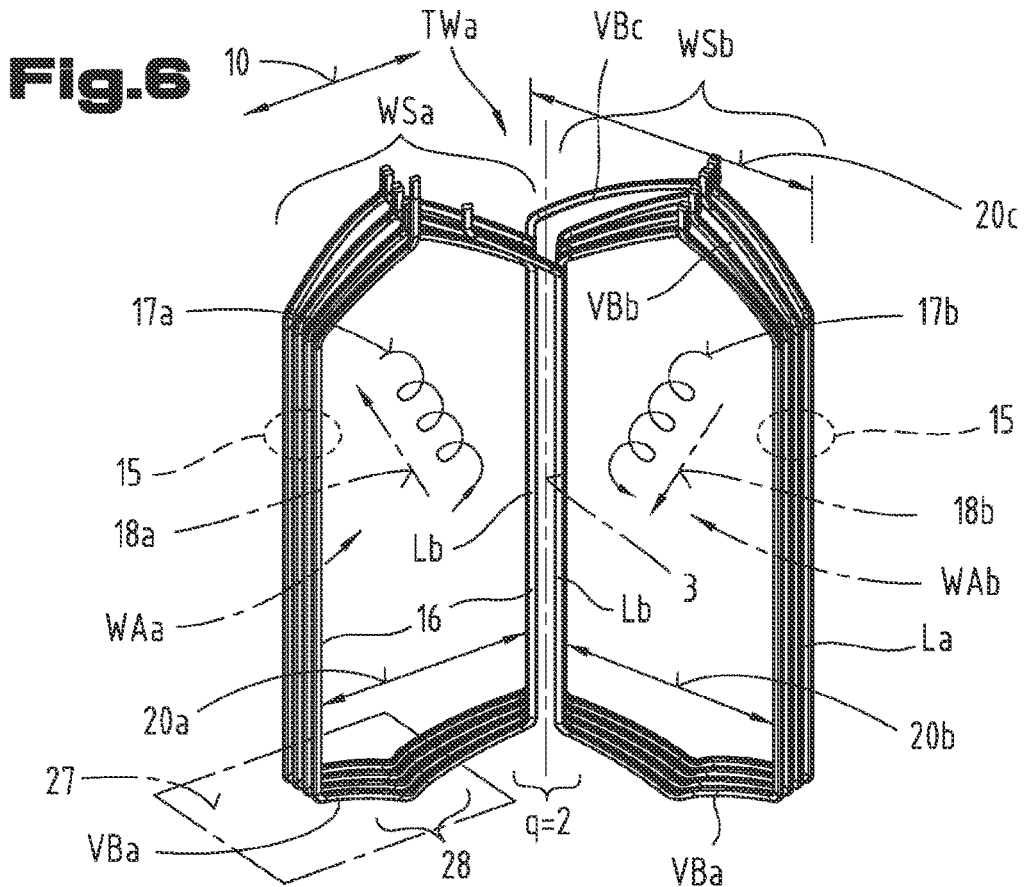

(51) Int. Cl.
*H02K 3/14* (2006.01)
*H02K 3/48* (2006.01)

(56) References Cited

U.S. PATENT DOCUMENTS

| | | | |
|---|---|---|---|
| 6,388,357 B1 | 5/2002 | Tokumasu et al. | |
| 9,520,753 B2 | 12/2016 | Rahman et al. | |
| 2012/0161569 A1* | 6/2012 | Hisada | H02K 3/28 310/201 |
| 2015/0061470 A1* | 3/2015 | Sekiyama | H02K 3/12 310/71 |
| 2019/0052141 A1* | 2/2019 | Mayr | H02K 15/024 |

FOREIGN PATENT DOCUMENTS

| | | | |
|---|---|---|---|
| JP | 2014-217136 A | | 11/2014 |
| JP | 2014217136 A | * | 11/2014 |

OTHER PUBLICATIONS

International Search Report in PCT/AT2019/060275, dated Dec. 16, 2019.

Heinrich Sequenz. "III. Spannungsvieleck und Wicklungsfaktoren" 6.7 In: Die Wicklungen elektrischer Maschinen in vier Banden. Erster Band: Wechselstrom-Ankerwicklungen. Wien.: Springer Verlag. pp. 99-185. Jan. 1, 1950 (Jan. 1, 1950). XP055649748 pp. 124.136 (with concise statement of relevance).

* cited by examiner

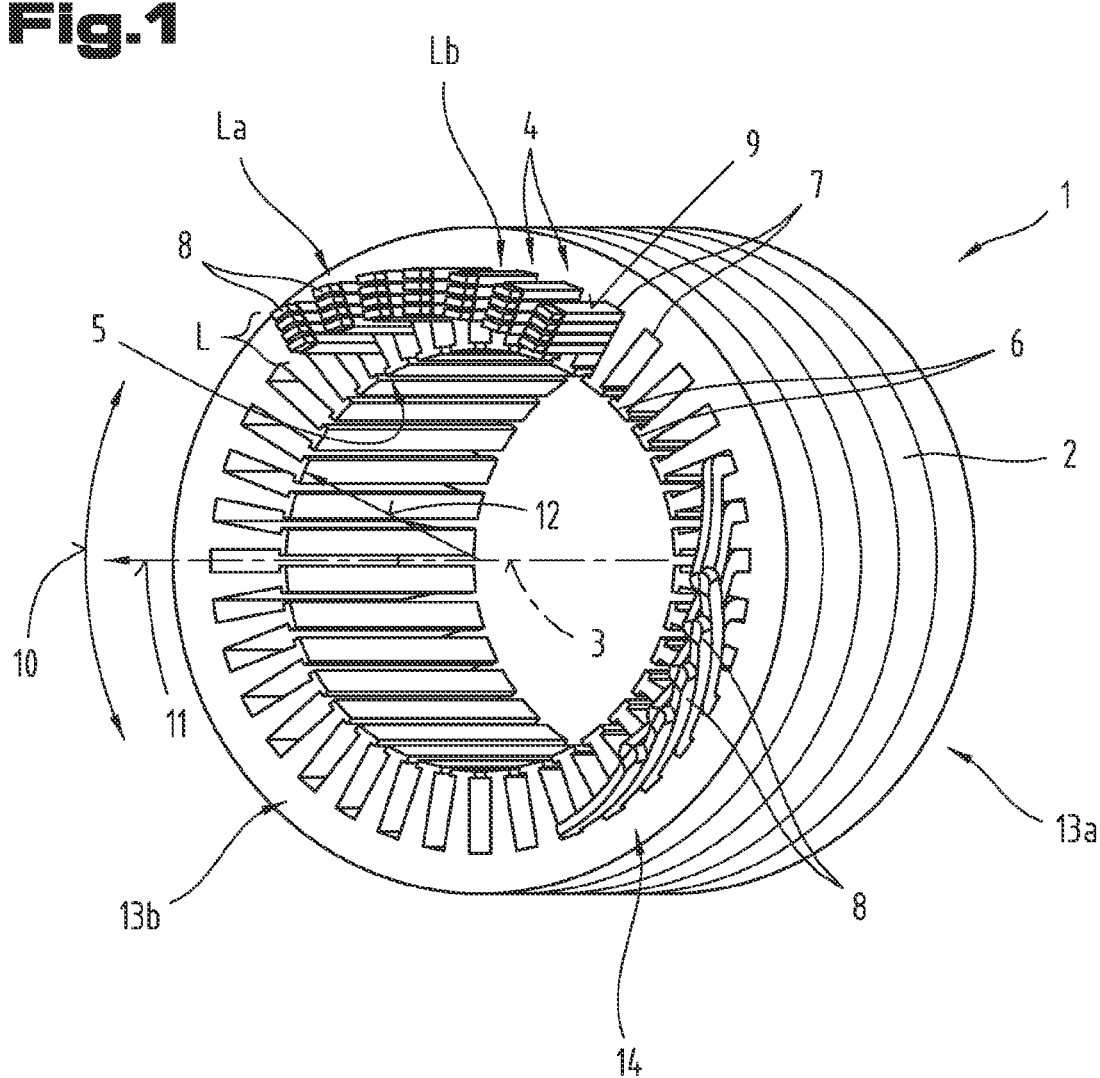

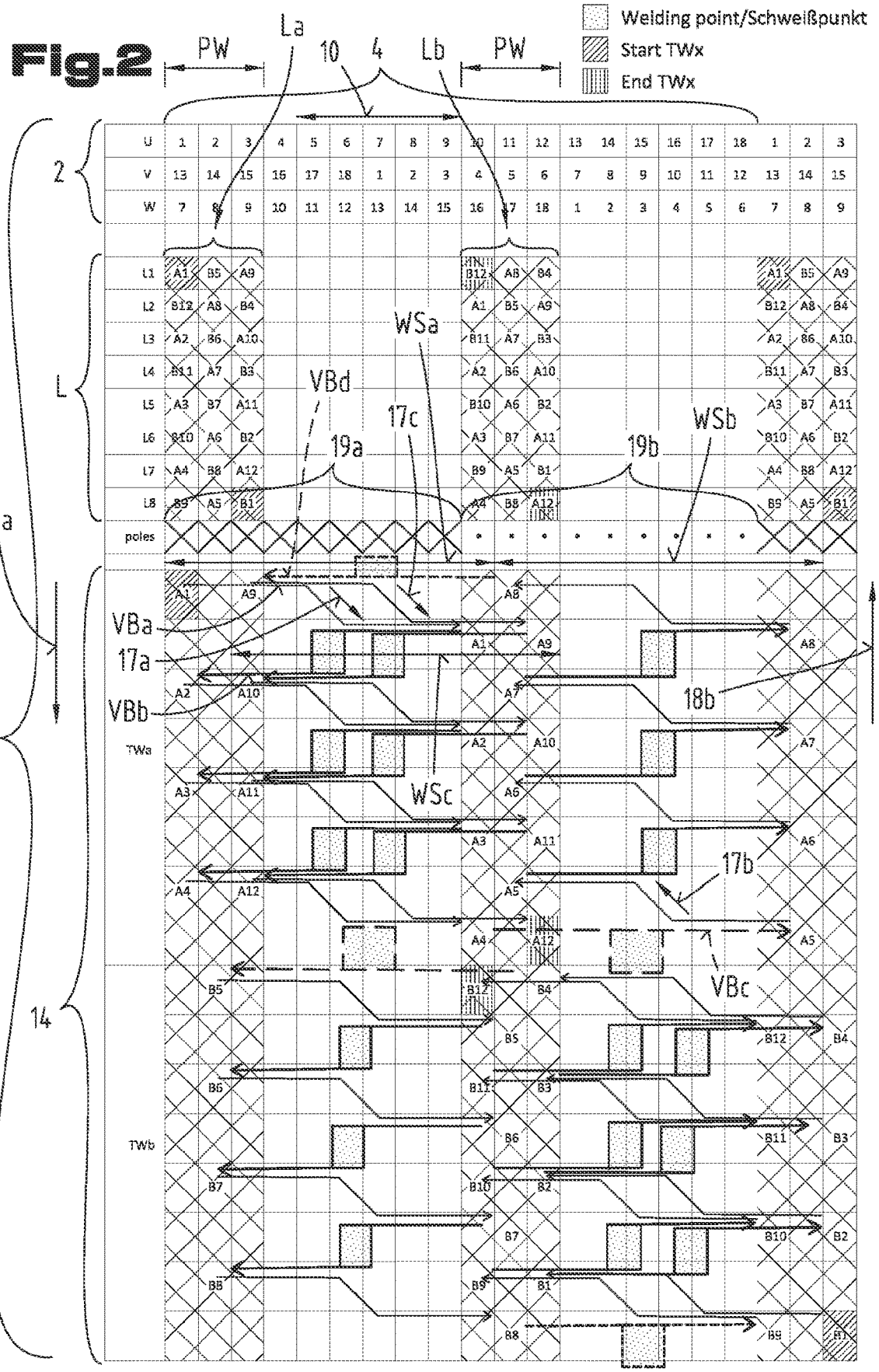

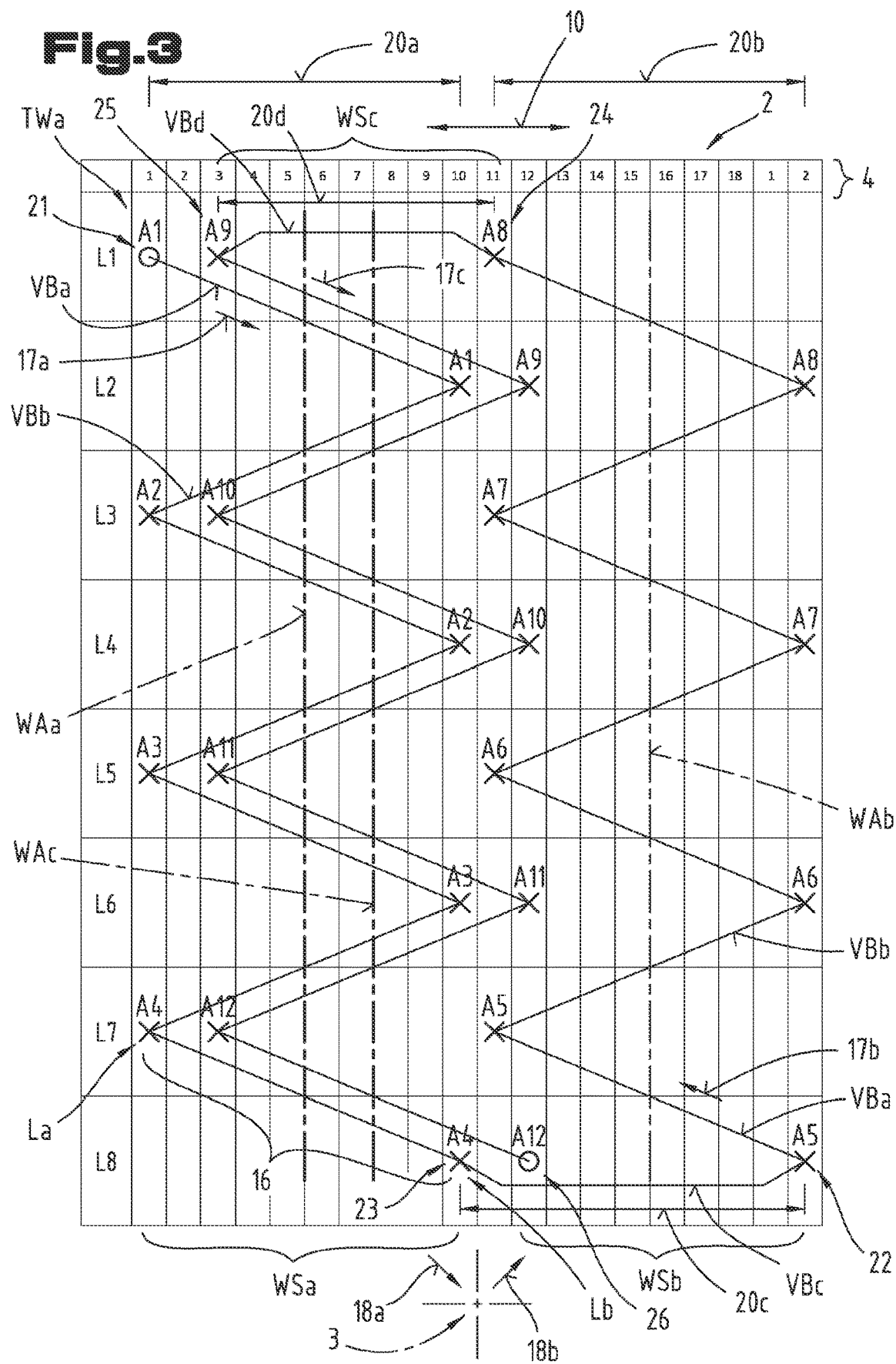

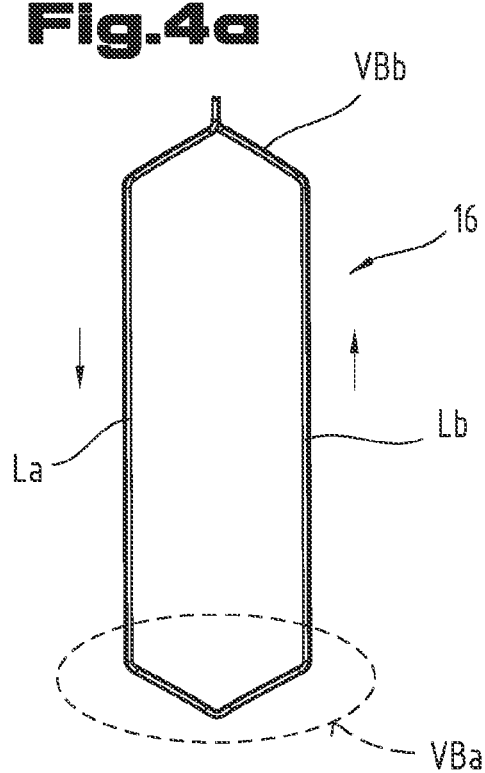
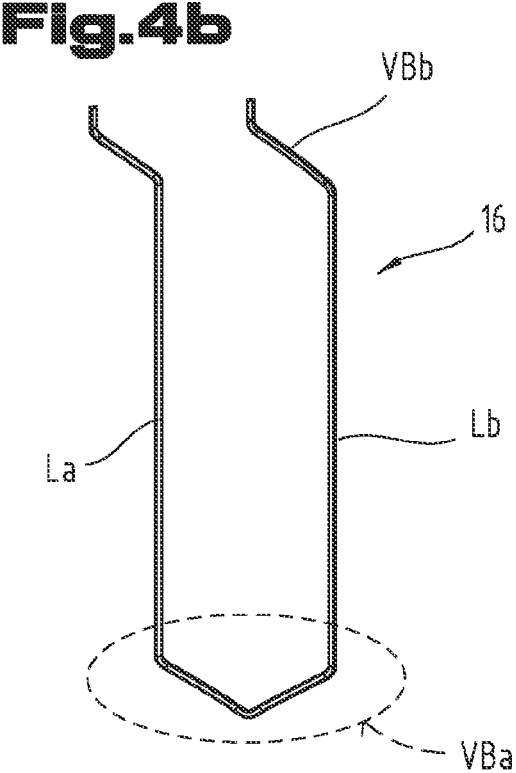
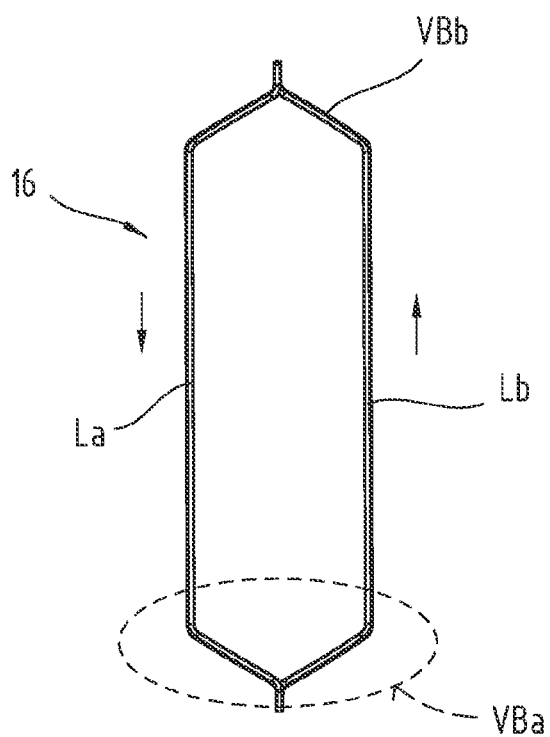

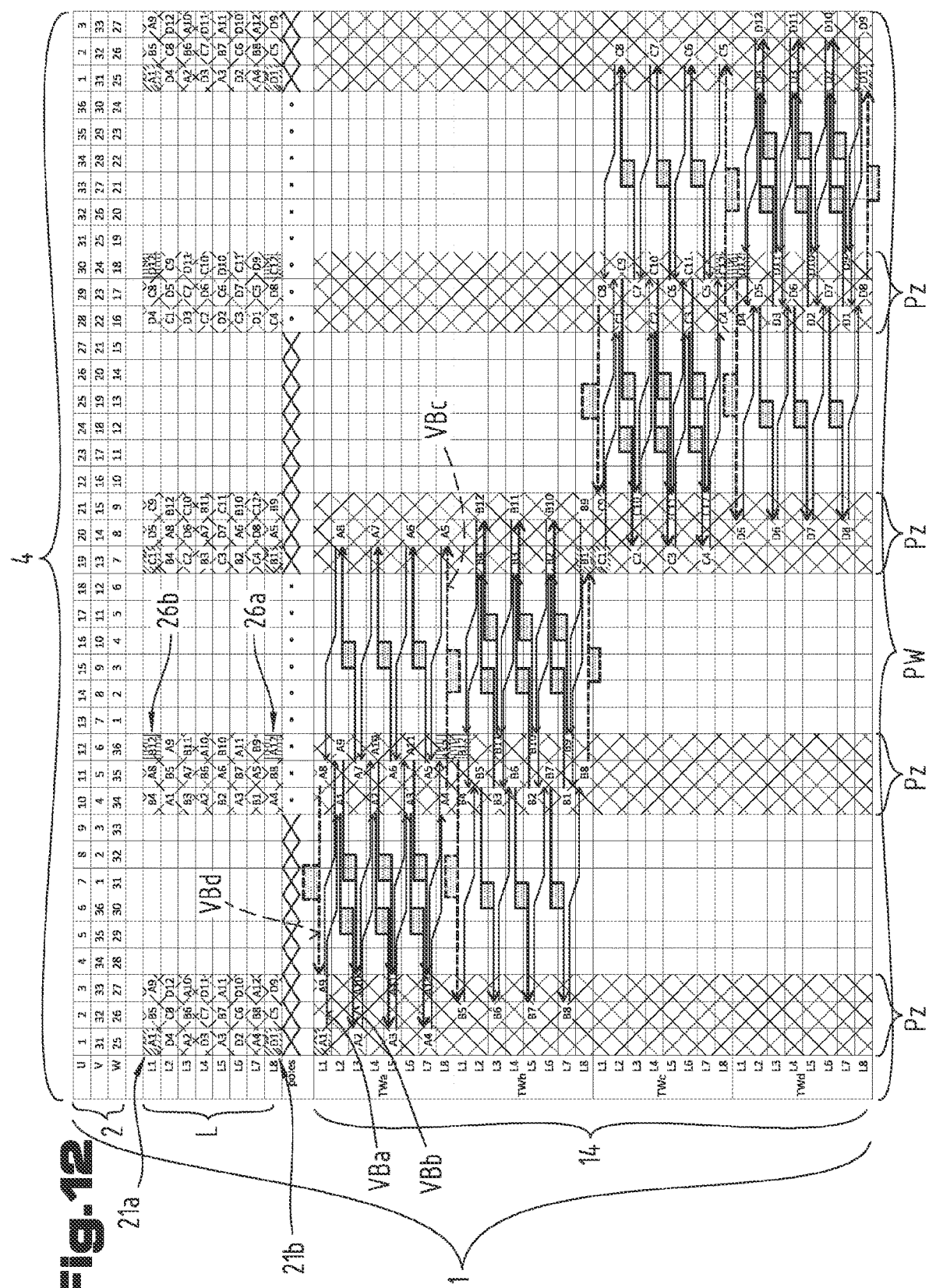

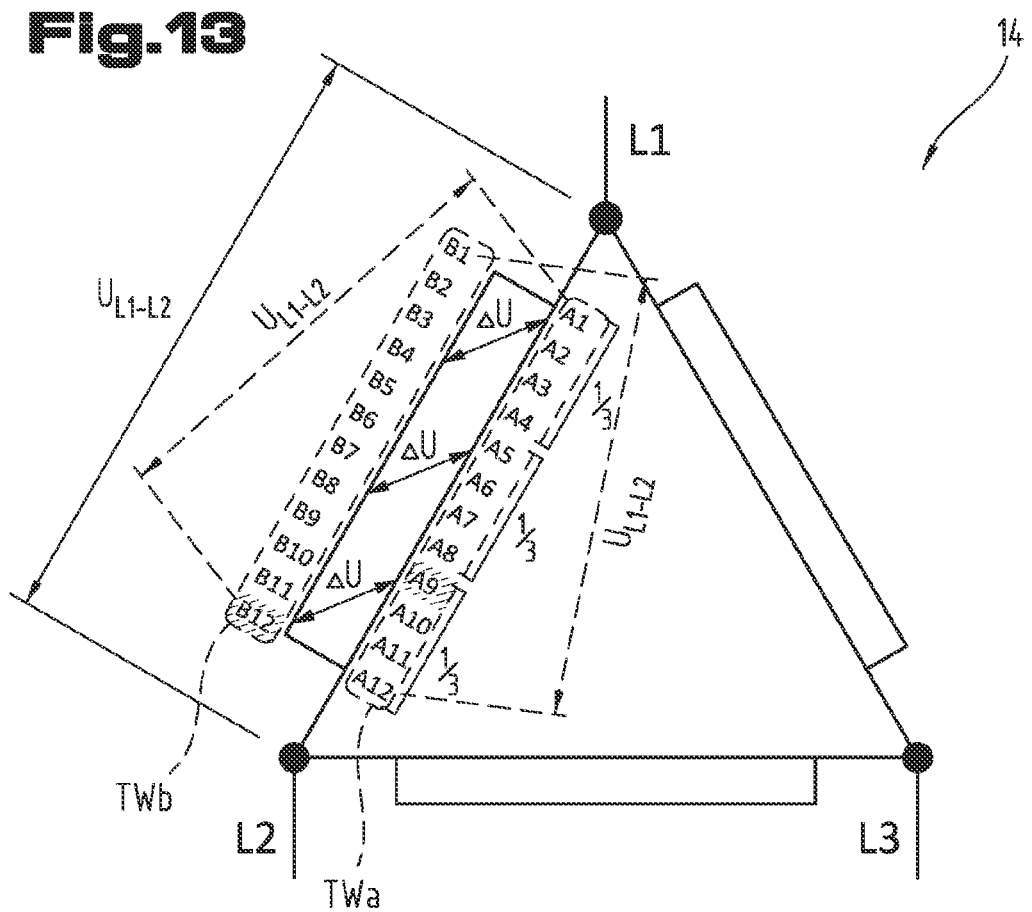

STATOR FOR AN ELECTRICAL MACHINE

CROSS REFERENCE TO RELATED APPLICATIONS

This application is the National Stage of PCT/AT2019/060275 filed on Aug. 27, 2019, which claims priority under 35 U.S.C. § 119 of Austrian Application Nos. A50756/2018 filed on Sep. 5, 2018 and A51063/2018 filed Nov. 30, 2018, the disclosures of which are incorporated by reference. The international application under PCT article 21(2) was not published in English.

The invention relates to a stator for an electric machine as well as an electric machine equipped with such a stator.

Stators for electric machines, in particular for electric drive motors and/or generators, known from the prior art typically comprise a hollow-cylindrical laminated core, in whose grooves the electric stator winding is received. In this case, the stator winding may be composed of a plurality of rod-shaped conductor sections and/or electric forming rods. In embodiments of the stator winding known from the prior art, for example in accordance with U.S. Pat. No. 9,520,753 B2, the current path of the serially-connected conductor sections runs in a meandering manner at least over a partial section of the circumference of the laminated core. These windings may also be referred to as wave windings. Such wave windings are relatively inflexible with regard to their number of interconnection options.

A stator for an electric external-rotor radial flux machine is known from DE202016001273U1. This stator has a multi-phase stator winding made of flexible winding wire, wherein the winding wire is wound up on the individual stator teeth and/or on the so-called pole shoes of the laminated core and forms a plurality of individual coils. These individual coils may also be referred to as tooth-coil windings. A thusly constructed stator is suitable only to a limited extent for achieving high-volume production numbers. In addition, the winding diagram shown has only little flexibility with regard to its number of interconnection options.

It was the object of the present invention to overcome the disadvantages of the prior art and to make available an improved stator which offers a great flexibility with regard to its number of interconnection options while being able to be manufactured in large quantities and as low-cost as possible.

This object is achieved by a stator and an electric machine in accordance with the claims.

A stator for an electric machine in accordance with the invention comprises
  an essentially hollow-cylindrical laminated core having a first and a second axial front end and having multiple receiving grooves arranged so as to be distributed along a circumferential direction of the laminated core and extending along a longitudinal axis of the laminated core,
  multiple electric conductor sections per receiving groove formed by forming rods, which conductor sections form a stator winding by predetermined electric connections, which stator winding has multiple layers of conductor sections immediately adjacent in a radial direction to the longitudinal axis of the laminated core,
  wherein the stator winding comprises at least two electric part-windings per phase winding and/or winding phase, which part-windings are formed by multiple serially-connected conductor sections, wherein first and second electric connecting sections between electrically serially-connected conductor sections are allocated to the first and to the second axial front end of the laminated core, and wherein two serially-connected conductor sections define a pair of forming rods.

A stator in accordance with the invention is further characterized in that
  the at least two electric part-windings are respectively formed by at least one first and one second electrically series-connected winding segment, wherein conductor sections of the first winding segment are electrically interconnected by means of the first and second electric connecting sections such that a helical current path is defined along a first radial direction to the longitudinal axis of the laminated core and conductor sections of the second winding segment are electrically interconnected by means of the first and second electric connecting sections such that a second helical current path is defined along an opposite, second radial direction to the longitudinal axis of the laminated core.

The stator in accordance with the invention is characterized by its great flexibility with regard to the number of interconnection options, for example with regard to the possible number of parallel branches and/or part-windings, with regard to the chording options of the part-windings and with regard to the number of conductors in the receiving grooves. In addition, it is of advantage that the specified winding diagram can be implemented using so-called forming rods and/or forming-rod conductors, so that, colloquially, a pin winding or hairpin winding can be created. This facilitates a high-volume production of stators with high and/or consistent manufacturing quality. In particular, this also enables a cost reduction in the manufacturing process to be achieved. Further, a plurality of winding specifications are feasible and/or a plurality of winding specifications can be met using the specified structure and using the winding pattern described here.

In this case, the stator winding is configured of multiple loop windings using forming-rod technique. In particular, it is provided to use versatile-use loop windings using forming-rod technique. Here, serially-connected individual coils and/or winding segments made up of rod-shaped conductor sections are provided, which serially-connected winding segments lie under the same pole pair and define a part-winding of a single phase winding and/or of the stator winding.

In particular, a number of parallel branches and/or part-windings equal to the number of poles of the stator and/or motor is implementable.

In particular, it may be expedient if the first and second winding segment span two, in a circumferential direction of the laminated core immediately-subsequent, magnetic pole sections. A part-winding will thus have exactly two pole coverings, which means that, in terms of a momentary observation, it can extend across a north and a south pole of the stator.

In addition, it may be provided that the first winding segment and the second winding segment have respectively immediately-subsequent conductor sections in terms of their helical current paths, which immediately-subsequent conductor sections are arranged staggered relative to one another and/or spaced apart from one another in a radial direction to the longitudinal axis of the laminated core, respectively by a crossover with a crossover width of "one." In a plan view onto the front side of the stator, this results in a zigzag-like configuration of the series-connected conductor sections and/or forming rods, wherein this structure can facilitate an automated production of the stator winding.

To construct unchorded stator windings and/or part-windings, it is possible in a simple manner to allocate to the first and second electric connecting sections identical first expansion widths per winding segment between electrically serially-connected conductor sections spaced apart from one another in a circumferential direction of the laminated core. In particular, a simple planning and/or designing of unchorded windings can be achieved by consistent number-of-grooves crossover widths.

To electrically connect the first winding segment and the second winding segment, a third electric connecting section may be configured in a workable manner, which third electric connecting section has a larger second expansion width, in particular a relatively larger number-of-grooves crossover width, in comparison to the first and the second electric connecting section.

In contrast to this, to form chorded part-windings, the first and second electric connecting sections may, in each of their winding segments, have different first expansion widths, in particular unequal number-of-grooves crossover widths, between electrically serially-connected conductor sections spaced apart from one another in a circumferential direction of the laminated core. The specified structure therefore ensures that also chorded stator windings are designable and implementable in a relatively simple manner A stator with a chorded stator winding is therefore characterized in that the number of shortened or extended second connecting sections in each of the part-windings is identical to the number of fractional slots q of the stator. In this case, the shortened or extended second connecting sections are configured shorter or longer in comparison to the first connecting sections. In particular, the number of fractional slots q is identical here to the number of the receiving grooves per magnetic pole section, per phase winding and per part-winding. The forming of shortened or extended connecting sections depends on whether the stator winding and/or the respective part-windings are to be chorded toward the left or toward the right in terms of the circumferential direction of the laminated core.

To implement a stator with q=3 as a number of fractional slots, a third winding segment may be provided in a simple manner, which third winding segment is electrically series-connected to the second winding segment and, for the most part, is superimposed on the first winding segment, in particular is configured interleaved and/or engaging with same. This superimposition and/or overlap may be configured such that a third winding axis of the third winding segment is offset relative to a first winding axis of the first winding segment by at least one to a maximum of six, in a circumferential direction of the laminated core immediately-subsequent, receiving grooves.

To electrically connect the second winding segment and the third winding segment, a fourth electric connecting section may be configured, which fourth electric connecting section has a smaller or larger third expansion width, in particular comprises a relatively lower or higher number-of-grooves crossover width in comparison to the first and the second electric connecting section. A correspondingly shortened or enlarged fourth electric connecting section is configured exclusively if an integer number of fractional slots q is larger than two. This relative shortening or expanding of the fourth electric connecting section depends on where the beginnings of the part-windings are located within the phase zones of the stator winding. Such phase zones can be seen in FIGS. 2, 9 and 10, as marked by the cross-hatched areas and/or receiving grooves.

In the specified stator, it may also be achieved that the number of the winding segments is identical to the number of fractional slots q of the stator, in particular is identical to the number of the receiving grooves per magnetic pole section, per phase winding and per part-winding.

An advantageous design of the stator may also be characterized in that the current path defined by the first winding segment either (i), starting from the radially-innermost layer of conductor sections, leads to the radially-outermost layer of conductor sections, or vice versa (ii), starting from the radially-outermost layer of conductor sections, leads to the radially-innermost layer of conductor sections, is subsequently guided, without an offset in the layer, in particular without crossover and/or without a change in the layer, by means of a third electric connecting section to the second winding segment, and that the current path in the second winding segment either (i), starting from the radially-outermost layer of conductor sections, is guided to the radially-innermost layer of conductor sections, or vice versa (ii), starting from the radially-innermost layer of conductor sections, is guided to the radially-outermost layer of conductor sections.

According to an advantageous embodiment, it may also be provided that respectively two, in the electric current paths immediately-subsequent, conductor sections and respectively one first connecting section respectively electrically connecting these conductor sections are formed as one piece, in particular are formed by a so-called hairpin. This enables a streamlined production to be attained and/or the number of the required contact points, for example in the form of welded joints, to be reduced.

In accordance with a possible further development, it may be provided that the first connecting section, in its middle section, has an essentially S- or Z-shaped forming section in terms of a plane running perpendicular to the longitudinal center axis of the laminated core. This facilitates the implementation of a crossover by "one" in terms of the two conductor sections of a U-shaped pair of forming rods and/or hairpin.

In a stator constructed according to the specified winding diagram, it may also be provided that each of the receiving grooves of the laminated core is completely filled in terms of the radial direction to the longitudinal axis of the laminated core with conductor sections from exactly two part-windings arranged in parallel. This means that each receiving groove of the laminated core can be completely occupied by the conductor sections of a maximum of two and/or only two part-windings arranged in parallel. This may have advantages in terms of production engineering.

According to an expedient measure, it may also be provided that the first winding segment and the second winding segment, starting from their respective beginnings of the winding in a direction toward their respective ends of the winding, are respectively wound in the same direction, for example respectively wound clockwise.

In addition, it may be expedient if any and all winding segments of a multiply-segmented part-winding are electrically series-connected and, starting from their respective beginnings of the winding in a direction toward their respective ends of the winding, are respectively wound in the same direction, for example respectively wound clockwise.

In accordance with an advantageous embodiment, it may be provided that a beginning of the winding of the first part-winding and a beginning of the winding of another part-winding, which is electrically connected or connectable in series or electrically connected or connectable in parallel to the first part-winding, are positioned such that their beginnings of the winding are arranged in receiving grooves which belong to the same phase zone. In particular, it may be expedient if a beginning of the winding of the first part-winding and a beginning of the winding of another part-winding, which is electrically connected or connectable in series or electrically connected or connectable in parallel to the first part-winding, are positioned in the same receiving groove and/or allocated to the same receiving groove. This is useful in particular whenever the part-windings of the stator winding are configured unchorded. In the operating mode of the stator and/or the electric machine equipped with it, this ensures that the maximum voltage difference AU occurring between immediately-adjacent conductor sections within the receiving grooves—in particular in terms of the radial direction to the longitudinal axis of the laminated core—can be kept relatively low. This has advantages in terms of technically and/or physically relatively lower requirements for the electric insulation layer of the conductor sections. For example, this ensures that relatively thin insulation layers can be provided and thus the space factor in terms of electrically-conductive material per receiving groove can be advantageously improved.

The actions and technical effects described above can also be attained whenever, in terms of receiving grooves with beginnings of the winding provided there or ends of the winding provided there, respectively only beginnings of the winding or respectively only ends of the winding are configured, i.e. generically-identical connections are pooled and/or grouped generically identically at multiple specific receiving grooves of the laminated core. In particular, this enables the voltage load between respectively two adjacent conductor sections within a receiving groove to be reduced.

It may further be provided that the first and the last conductor section of at least one of the part-windings is formed respectively by an I-pin, in particular is formed respectively by essentially I-shaped forming rods, and all conductor sections arranged in between are configured as electrically series-connected hairpins, in particular as U-shaped pairs of forming rods. This ensures in an advantageous manner that the phase and/or power connections for the part-windings can be allocated to the axial front end of the stator in which the so-called "crown side" of the stator winding is located. The "crown side" is the front end of the stator in which either no or only relatively few welded points and/or joints between the conductor sections are located when the stator winding is made up, at least for the most part, of hairpins. This enables the power connections for the application of electric energy to the phase windings and/or to the part-windings to be reliably constructed and manufactured in an uncomplicated manner Furthermore, this ensures that as compact a structure of the stator and/or its axial winding heads as possible is attainable.

The invention also relates to an electric machine as it is specified in the claims. The technical effects and advantageous actions thereby attainable are to be gathered from the preceding and the following parts of the description.

For the purpose of better understanding of the invention, it will be elucidated in more detail by means of the figures below.

Figure 7:
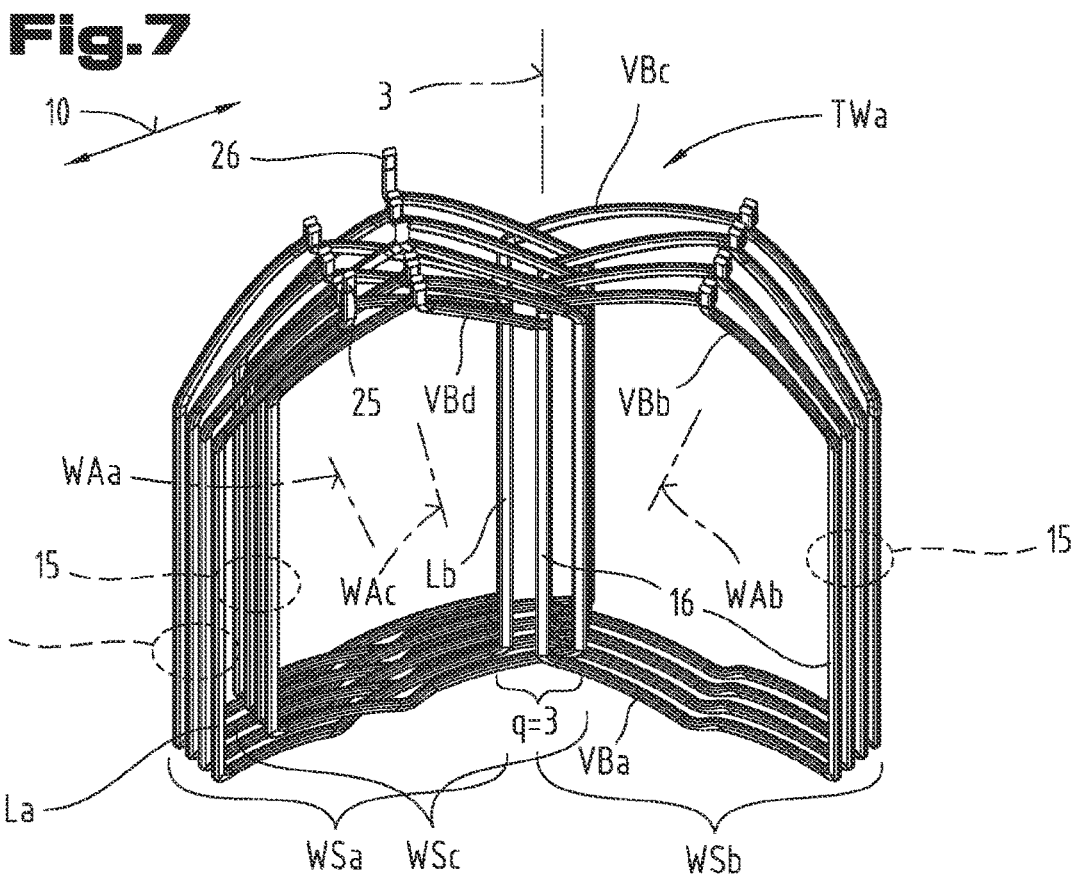
Figure 8:
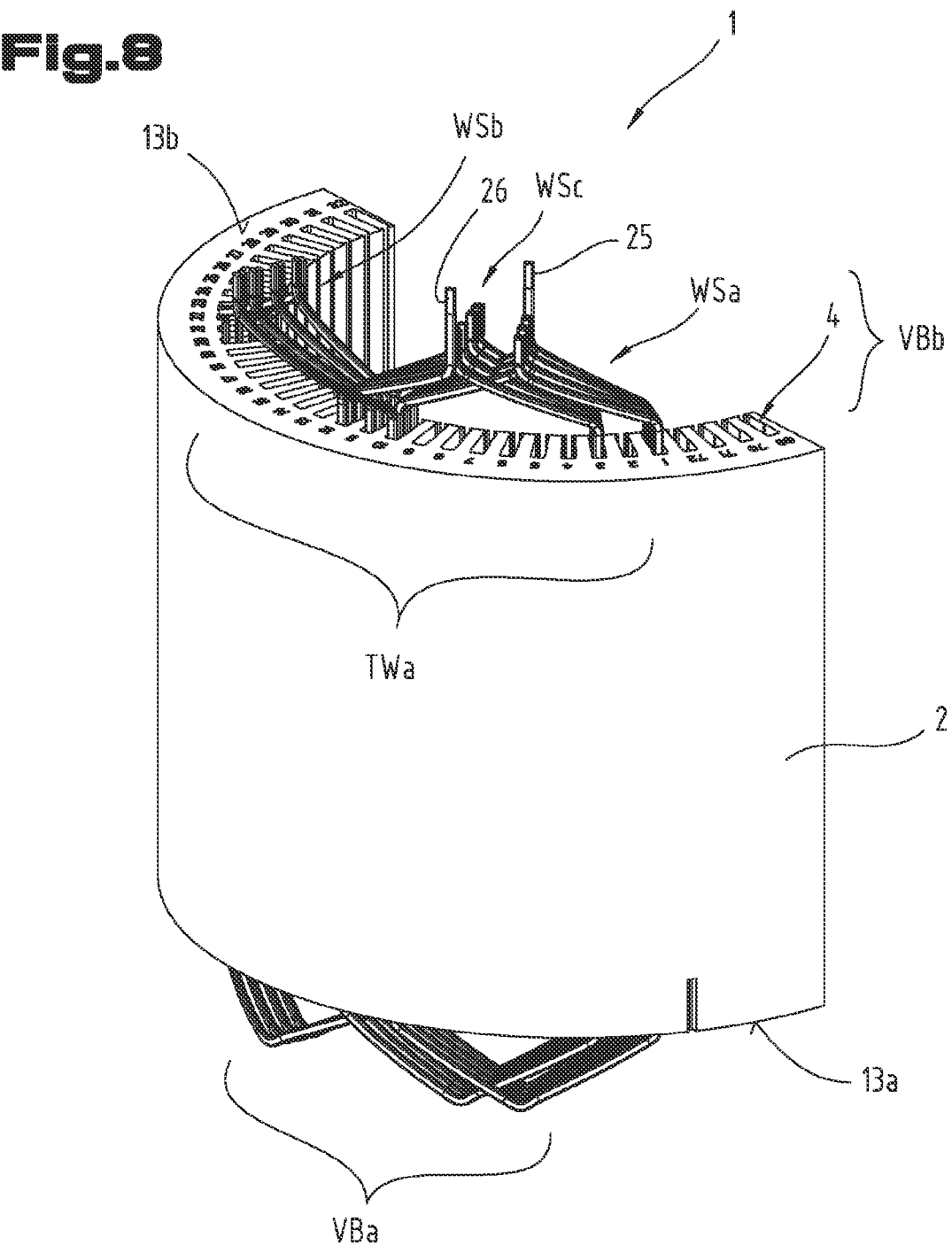
Figure 9:
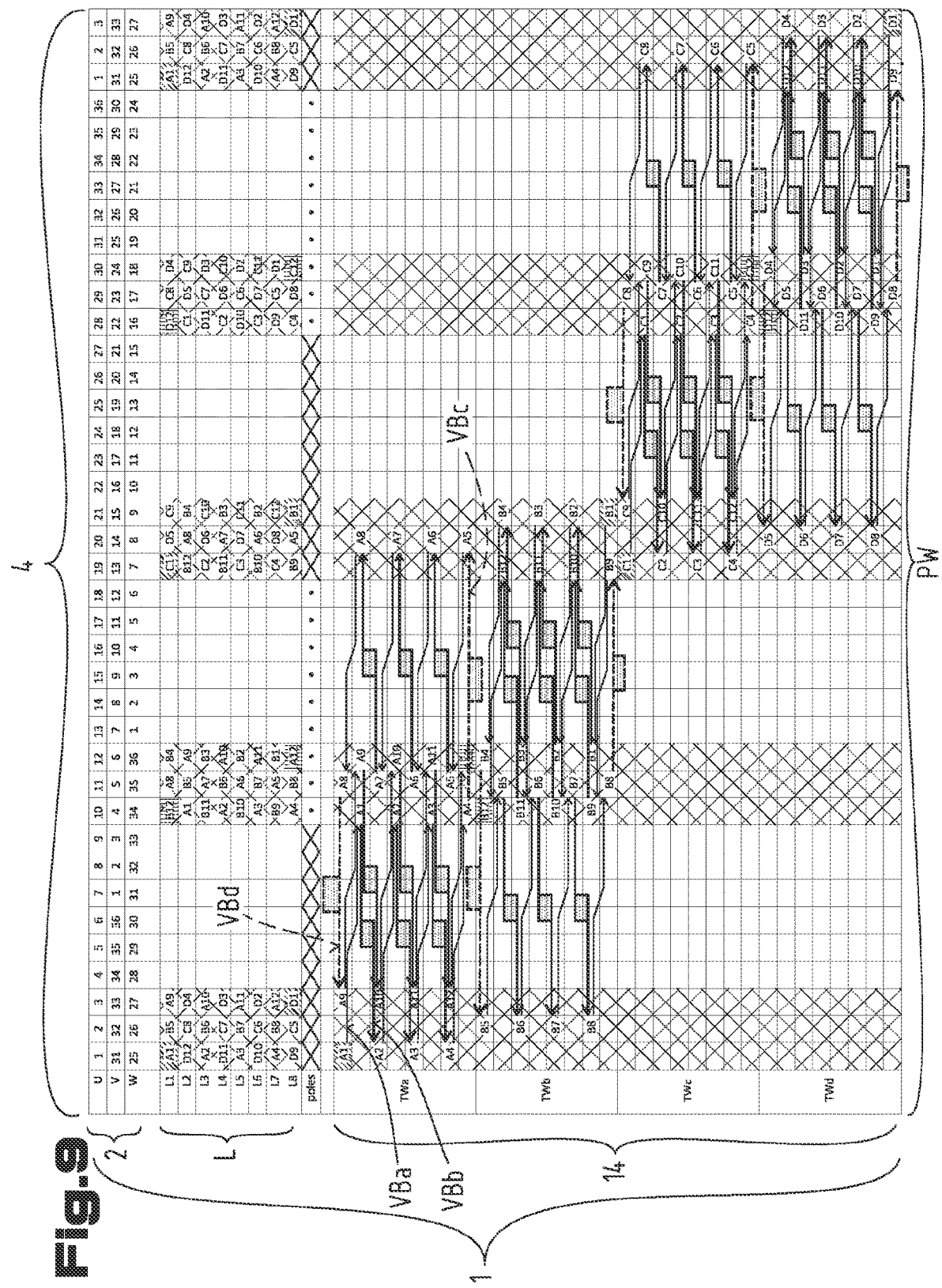
Figure 10:
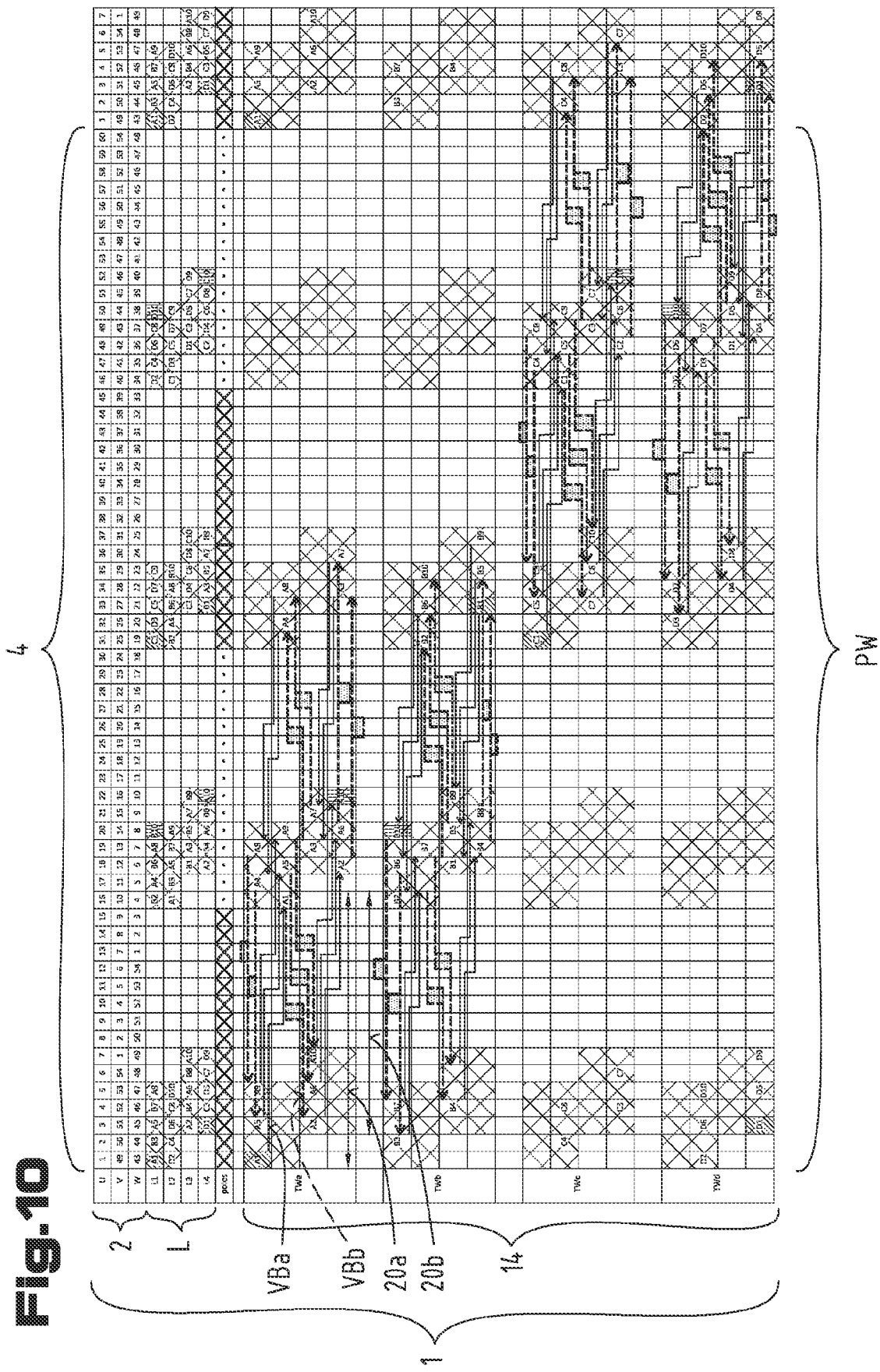
Figure 11:
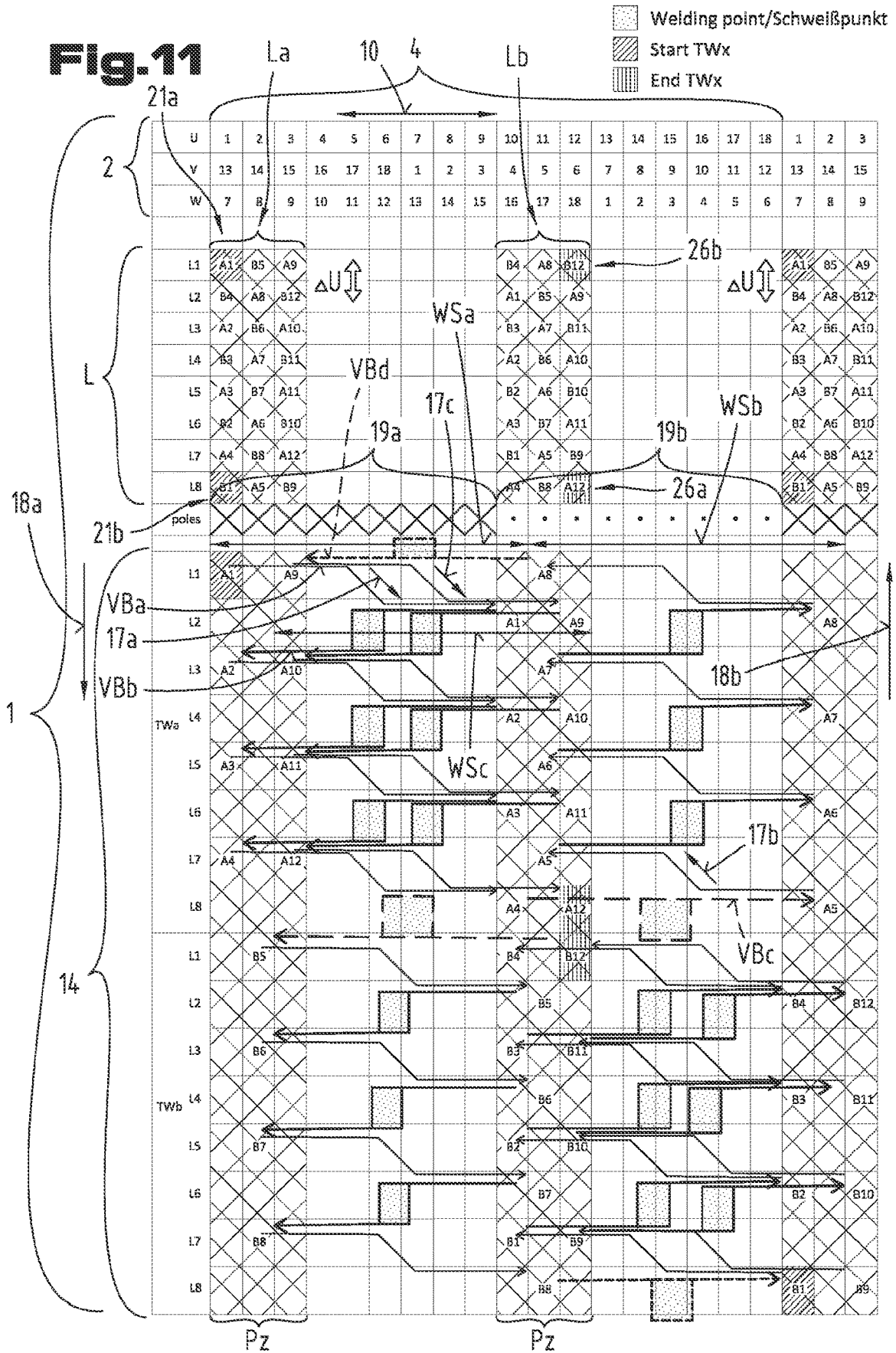

In a strongly simplified, schematic and exemplary depiction, each figure shows as follows:

FIG. 1 an exemplary stator whose receiving grooves are in part provided with electric conductors, which electric conductors are to be connected in a defined manner to form a stator winding;

FIG. 2 a winding diagram configured in accordance with the invention for forming a winding phase and/or a phase winding of a two-pole stator with three-phase stator winding;

FIG. 3 another way of depicting the winding diagram for a part-winding of the winding phase and/or the phase winding according to FIG. 2;

FIGS. 4a, 4b embodiments of so-called hairpins with conductor sections running in parallel, which may form part of a winding phase and/or a phase winding according to FIGS. 2 and 3;

FIG. 5 an embodiment of so-called I-pins, which are formed and electrically interconnected such that they resemble a hairpin and can form part of a winding phase and/or a phase winding according to FIGS. 2 and 3;

FIG. 6 a part-winding of a stator winding, which part-winding comprises two electrically serially-connected winding segments, respectively configured as loop windings in a forming-rod configuration;

FIG. 7 a part-winding of a stator winding, which part-winding comprises three electrically serially-connected winding segments in a forming-rod configuration, respectively configured as loop windings and interleaved and/or engaging with one another;

FIG. 8 half of a stator and/or stator laminated core, in which the part-winding according to FIG. 7 has been inserted and/or is received therein;

FIG. 9 a winding diagram configured in accordance with the invention having multiple part-windings for creating a four-pole stator with a three-phase, unchorded stator winding;

FIG. 10 a winding diagram configured in accordance with the invention having multiple part-windings for creating a four-pole stator with a three-phase, chorded stator winding;

FIG. 11 a winding diagram on the basis of FIG. 2 in which the maximum difference in potential occurring between immediately-adjacent conductor sections within the receiving grooves of the laminated core is kept relatively low;

FIG. 12 a winding diagram on the basis of FIG. 9 in which the maximum difference in potential occurring between immediately-adjacent conductor sections is kept relatively low;

FIG. 13 the part-windings TWa and TWb in accordance with the winding diagram according to FIG. 11 connected in parallel, wherein they form a winding phase and/or a phase winding of a delta-connected three-phase stator winding.

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, and these specifications of location are to be analogously transferred to the new position.

FIG. 1 is a strongly-schematic depiction of a stator 1 in an oblique view. Here, the stator 1 comprises an essentially hollow-cylindrical laminated core 2 in which a plurality of receiving grooves 4 are arranged distributed in a circumferential direction 10. Here, the receiving grooves 4 are continuously formed in a longitudinal direction 11. In FIG. 1, multiple electric conductors 8 are depicted in an exemplary manner before being connected to an electric winding. Analogously, it can be seen from FIG. 1 in an exemplary manner that multiple electric conductors 8 can be bent for forming an electric coil and/or winding in a circumferential direction of the laminated core 2 and electric conductors 8 corresponding with one another can be interconnected.

The receiving grooves 4 of the laminated core 2 can be open in a radial direction 12 in a direction of the longitudinal axis 3 of the stator 1. Such openings can be configured as an air gap 5. The areas of the laminated core 2 which delimit the receiving grooves 4 in a direction of the longitudinal axis 3 can be configured as a tip of a tooth 6 in a circumferential direction 10. The opposite side of the respective receiving groove 4, also referred to as yoke side, is where the groove base 7 is located. The precise number of receiving grooves 4 as well as the electric conductors 8 received therein is determined by the desired size and/or design of the electric machine.

In principle, the receiving grooves 4 can have most different cross-sectional shapes, wherein corresponding rectangular cross sections of the receiving grooves 4 are tried and trusted for receiving electric conductors 8. To insulate the individual electric conductors 8 relative to one another as well as to the laminated core 2, it is required to flawlessly form at least one insulation layer 9 in a circumferential direction 10 as well as radial direction 12 in a continuously-closed manner, in particular to provide it at the lateral surface of the conductors 8, wherein the electric conductors 8 are respectively coated with an insulation layer 9, at least within the laminated core 2.

The essentially hollow-cylindrical laminated core 2 has a first and a second axial front end 13a, 13b. The electric conductors 8 in the receiving grooves 4 are preferably formed by metal forming rods, preferably made of copper or another material with good electrical conductivity. Here, these forming rods form a plurality of electric conductor sections La, Lb, which extend at least within the respectively-allocated receiving grooves 4. These conductor sections La, Lb may, in this case, be defined by so-called I-pins or be formed by so-called hairpins, in which latter case the conductor sections La, Lb constitute the legs of these essentially U-shaped conductor segments.

Therefore, the electric conductor sections La, Lb are arranged multiply in each of the receiving grooves 4 and the diagrammed stator winding 14 is constructed by predetermined electric connections between the annularly-positioned conductor sections La, Lb, which stator winding 14 serves to generate a circumferential magnetic field when single-phase or multiple-phase electric energy is applied to the stator 1. As can be seen in an exemplary manner from FIG. 1, such a stator winding 14, in the ready-to-use state, has multiple layers L of conductor sections La, Lb, which layers L are immediately adjacent in a radial direction to the longitudinal axis 3 of the laminated core 2. The supplying of single-phase alternating current or of multi-phase alternating current (three-phase current) is done via specific connection points, not depicted in more detail, at the stator winding 14, as this is widely understood.

In the stator winding 14 in accordance with the example according to FIG. 2, a total of eight layers L1 to L8 are provided. Here, the layers L1 to L8 are composed of a plurality of conductor sections La, Lb positioned in the receiving grooves 4. Typically, a practical stator 1 has an even number of layers L, preferably from 4 layers, in particular between 4 and 12 layers. The diameter of the laminated core 2, the number of the receiving grooves 4 configured, the number of the layers L, as well as the axial length of the stator 1 and/or laminated core 2 essentially depend on which performance data is required and/or which physical requirements are in place for the electric machine to be constructed.

The stator winding 14 comprises at least two part-windings TWa, TWb. A stator 1 structured in accordance with the invention and/or its stator winding 14 can in particular have a multiple of two part-windings, in particular comprise two, four, six, eight or even ten part-windings, as this is described below. In this case, the respective part-windings can be connected in series and/or in parallel per electric phase. The winding diagram specified below enables a formation of single- or multi-phase stator windings 14.

In case of a multi-phase stator winding 14, each so-called phase winding PW and/or each winding phase pertaining to a phase may be composed of two or more part-windings TWa to TWx, wherein x represents an even number larger than two. Here, the part-windings TWa to TWx, which constitute electrically-separate coils, can be connected in series and/or in parallel and/or be connected accordingly by a control unit, depending on the demand and/or power requirement. In the exemplary embodiment depicted in FIG. 2, for the sake of better clarity only a single phase winding PW and/or a single winding phase of a stator winding 14 is depicted whichstator winding 14 is, overall, provided as a three-phase stator winding 14.

FIG. 2 shows an advantageous winding diagram for the winding phase and/or for the phase winding PW of a two-pole stator winding 14 in accordance with the example. This phase winding PW comprises two coil sections and/or two electric part-windings TWa, TWb. The two part-windings TWa and TWb may also be referred to as first and second winding branches and/or as first and second parallel paths. In this two-pole stator 1, each of the part-windings TWa and TWb extends over the entire circumference, in particular over 360° of the annular laminated core 2. In the exemplary embodiments described below, the individual part-windings extend only over a fraction of the circumference of the laminated core. The laminated core 2 in accordance with FIG. 2, in accordance with the example, has eighteen receiving grooves 4, wherein each of the receiving grooves 4 respectively comprises and/or receives eight conductor sections La or Lb, so that the stator winding 14 has a total of eight layers L, which are referred to as L1 to L8. Therefore, a stator winding 14 and/or a phase winding PW with a total of eight layers L is depicted. Here, the layer L1 can be understood to be the layer located closest to the air gap 5—FIG. 1—and/or the radially-innermost layer and the layer L8 can be understood to be the layer located closest to the groove base 7—FIG. 1—and/or the radially-outermost layer L8. The depicted stator winding 14 and/or phase winding PW has a so-called number of fractional slots q=3. This means that the number of the receiving grooves 4 per magnetic pole section 19a or 19b, per electric phase and/or phase winding PW and per part-winding TWa or TWb is exactly "three." This is apparent in FIG. 2 also by means of the groups of three receiving grooves 4, which are marked with cross-hatching.

It can further be seen from FIG. 2 that, in accordance with the example, the two depicted part-windings TWa and TWb pertain to the electric phase U—see first line in FIG. 2. To construct a stator winding 14 with a total of three phases, the sections and/or receiving grooves 4 depicted as unoccupied in FIG. 2 are to be provided with corresponding further part-windings. In particular, the structure of the depicted phase winding PW repeats for the phase V and for the phase W in the receiving grooves 4 with the numbers 4 to 6 and 13 to 15 and/or 7 to 9 and 16 to 18. In particular, merely one lateral offset and/or groove offset is to be provided and/or to be taken into account, and the structure and/or the diagram of the phase winding PW for the phase U repeats thereafter for the phase windings of the phases V and W. Only for the sake of better clarity, the phase windings PW for the phases V and W are not included in the depiction in accordance with FIG. 2. In particular, it must be said that merely one phase winding PW, for example for the phase U, is illustrated in FIG. 2. The complete, three-phase stator winding is to be connected to a three-phase voltage source, wherein a magnetically two-pole stator 1 forms and/or a two-pole rotating magnetic field appears.

Each of the part-windings TWa and TWb of the stator winding 14 and/or of the phase winding PW is formed by a plurality of serially-connected conductor sections La and Lb. These conductor sections La and Lb may form part of a conduction segment which is integrally-structured and/or configured as one piece, in particular of a so-called hairpin, as it is depicted in FIGS. 4a and 4b. Alternatively, the conductor sections La and Lb can also respectively be formed by so-called I-pins, as this is illustrated in FIG. 5. Therefore, the conductor sections La and Lb may be defined by the legs of an essentially U-shaped conduction segment, in particular by a so-called hairpin—FIGS. 4a, 4b. Yet the conductor sections La and Lb may also be defined by the middle section of so-called I-pins which are electrically connected in series—FIG. 5.

The part-windings TWa and TWb are respectively formed by multiple serially-connected conductor sections La and Lb, wherein first and second electric connecting sections VBa, VBb between electrically serially-connected conductor sections La, Lb are allocated alternately to the first and the second axial front end 13a, 13b of the laminated core 2—FIG. 1—depending on which one is located closest. Here, the first connecting sections VBa form an electric connection between immediately-subsequent conductor sections La and Lb. In contrast to this, the second connecting sections VBb form an electric connection between a conductor section Lb and a conductor section La serially adjoining it. In accordance with FIGS. 4a, 4b and 5, therefore, the two conductor sections La and Lb are electrically connected in series by means of the connecting section VBa and thereby define a pair of forming rods 16. Such a pair of forming rods 16 can be electrically connected in series with a serially-adjoining and/or immediately-adjacent pair of forming rods 16 via the connecting section VBb, so that, overall, a so-called loop winding 15 can be constructed, as it is illustrated in an exemplary manner in FIGS. 6, 7. Here, the first connecting sections VBa are depicted in FIG. 2 by fine solid lines and/or arrows, whereas the second connecting sections VBb are illustrated in FIG. 2 by relatively broad solid lines and/or arrows. The fine lines located closest may here be mentally allocated to the first axial front end 13a, whereas the broad lines are mentally assigned to the second axial front end 13b of the stator 1 (FIG. 1).

Here, the rectangles depicted in FIG. 2 using dotted hatching symbolize contact points, in particular welded points, within the second electric connecting sections VBb. The conductor sections La and Lb provided in accordance with FIG. 2 are thus partial sections of so-called hair-pins, as they are illustrated in an exemplary manner in FIGS. 4a, 4b. The zones depicted in FIG. 2 using diagonal hatching respectively show the beginnings of the winding of the part-windings TWa and TWb, whereas the zones with vertical hatching represent the respective ends of the winding of the part-windings TWa and TWb. These assignments of hatching also apply to the winding diagrams in accordance with FIGS. 9 and 10.

In terms of the manner of depiction used in FIG. 3, which is an alternative to FIG. 2, a pair of forming rods 16, which is formed of the conductor sections La and Lb, is identifiable by a pair of cross and/or ring symbols. Such a pair of cross and/or ring symbols has identical numbers and a same leading letter. For example, the two cross symbols with the designation A4 define such a pair of forming rods 16 of conductor sections La, Lb. Further, the pairs of conductor rods in A3-A3, A2-A2 and A1-A1, for example, respectively form a pair of forming rods 16 having a first conductor section La in the receiving groove with the number 1 and a second conductor section Lb in the receiving groove with the number 10. The electric connection between two conductor sections La, Lb of a pair of forming rods 16, for example in terms of the pair of forming rods 16 between the identifiers A1, is referred to as connecting section VBa. In contrast to this, an electric junction and/or connecting section between a subsequent pair of forming rods 16 serially adjoining it and/or electrically connected in series, in accordance with the example in terms of the identifiers A2-A2, is defined and/or formed by the electric connecting section VBb. Here, the first connecting sections VBa located closest can be allocated to the first axial front end 13a of the laminated core 2 and the second connecting sections VBb located closest can be allocated to the second axial front end 13b of the laminated core 2—FIG. 1.

As this can be seen from FIG. 2, or also from FIG. 3 and FIGS. 6, 7, it is essential that the at least one electric part-winding TWa and/or each of the implemented part-windings TWa to TWx of a stator winding 14 and/or phase winding PW to be formed is formed at least by one first and one second electrically series-connected winding segment WSa, WSb. Here and also below, the index "x" respectively represents a counter variable. In this case, conductor sections La, Lb of the first winding segment WSa are electrically connected to each other by means of the first and second electric connecting sections VBa, VBb such that a helical current path 17a is defined along a first radial direction 18a to the longitudinal axis 3 of the laminated core 2—see the lower section of FIG. 3. In addition, conductor sections La, Lb of the second winding segment WSb are electrically connected to each other by means of the first and second electric connecting sections VBa, VBb such that a second helical current path 17b is defined. This second helical current path 17b runs along an opposite, second radial direction 18b to the longitudinal axis 3 of the laminated core 2. Here, the first radial direction 18a can be defined in terms of a radial diminishment relative to the longitudinal axis 3, whereas the opposite second radial direction 18b may mean a radial enlargement relative to the longitudinal axis 3 of the laminated core 2. Yet an inverse allocation of direction in terms of the current paths 17a and 17b is equally possible. Here, the second winding segment WSb is arranged laterally offset in terms of the circumferential direction 10 of the laminated core relative to the first winding segment WSa, in particular received in its entirety in receiving grooves 4 different from the first winding segment WSa and/or altogether different receiving grooves 4.

As can be gathered primarily from FIG. 2, the first and the second winding segment WSa, WSb, which, in interaction, are a component of the part-winding TWa and/or TWb, extend overall across two magnetic pole sections 19a and 19b immediately subsequent in a circumferential direction 10. Such a part-winding TWa and/or TWb thus has a pole covering of "two," as this can most easily be seen from FIG. 2. In other words, each of the configured part-windings TWa to TWx extends across a pair of magnetic poles, i.e. across two pole sections 19a and 19b which are immediately subsequent in a circumferential direction 10 of the laminated core 2. Also in stator windings 14 which have an even-numbered multiple of "two" as the number of poles (four-, six-, eight-pole etc.), the respectively-configured part-windings TWa to TWx always extend across a pair of magnetic poles, i.e. across two immediately-subsequent poles of the stator 1 to be formed, as this can also be gathered from the below exemplary embodiments in accordance with FIGS. 9 and 10.

As can further be seen from FIGS. 2 and 3, respectively, the first winding segment WSa and the second winding segment WSb have conductor sections La and Lb which are respectively immediately subsequent in terms of their helical current paths 17a, 17b, which conductor sections La, Lb are respectively arranged staggered relative to one another by a crossover with a crossover width of "one" in a radial direction to the longitudinal axis 3 of the laminated core 2. In accordance with the example, the conductor section Lb with the identifier A1 is received in the layer L2, whereas the conductor section La with the identifier A1 is received in the layer L1. This pattern continues for any and all conductor sections La and Lb of the winding segment WSa and/or WSb. This also applies to the third winding segment WSc yet to be described below.

As can further most easily be gathered from a combination of FIG. 2 and FIG. 3, it can be provided that, in order to create an unchorded stator winding 14 and/or to create unchorded part-windings TWa to TWx, the first and second electric connecting sections VBa, VBb per winding segment WSa, WSb have identical first expansion widths 20a, 20b (FIG. 3 above). These expansion widths 20a, 20b between the immediately-subsequent conductor sections La, Lb may also be referred to as number-of-grooves crossover width and/or frequently also as coil span. In accordance with the example, the expansion widths 20a, 20b of the first and second winding segment WSa, WSb respectively amount to ten receiving grooves. In particular, the expansion width 20a, 20b in accordance with the example between the electrically serially-connected conductor sections La, Lb spaced apart from one another in a circumferential direction 10 amounts to 10, in this case. However, depending on the dimensioning and/or design of the stator 1, also expansion widths 20a, 20b deviating from 10 are possible.

The part-winding TWa depicted in an exemplary manner in FIGS. 2, 3 further comprises a third electric connecting section VBc, which builds an electric connection between the first and the second winding segment WSa, WSb. In comparison to the first and second electric connecting section VBa, VBb, this third electric connecting section VBc has a larger, second expansion width 20c. In accordance with the example, this second expansion width 20c amounts to 11, in particular the third electric connecting section VBc expands between eleven immediately-subsequent receiving grooves. In particular, this means a relatively larger number of grooves and/or larger crossover than in the electric connecting sections VBa and VBb.

As can further most easily be gathered from FIGS. 2, 3, the at least one part-winding TWa and/or each of the existing part-windings TWa to TWx of a stator winding 14 may comprise a third winding segment WSc. This creates a number of fractional slots of q=3. Here, this third winding segment WSc is electrically series-connected to the second winding segment WSb. What is more, this third winding segment WSc, for the most part, is structurally superimposed on the first winding segment WSa. In particular, the third winding segment WSc is interleaved and/or interwoven with the first winding segment WSa, as this can be seen by means of the depictions from FIGS. 2 and 3, and also by means of the depiction in FIG. 7. In particular, it is provided here that a third winding axis WAc of the third winding segment WSc is laterally offset in a circumferential direction 10 of the laminated core 2 by at least one and/or at least two to a maximum of six immediately-subsequent receiving grooves 4 relative to a first winding axis WAa of the first winding segment WSa. The third winding segment WSc, for the most part, is thus superimposed on the first winding segment WSa and/or quasi-intertwined with same in terms of its base and/or active area. A considerably smaller proportion of the surface and/or active area of the third winding segment WSc is superimposed on the second winding segment WSb and/or intertwined with same, as this can most easily be gathered from the depiction in accordance with FIG. 7.

A fourth electric connecting section VBd is configured to electrically connect the second winding segment WSb and the third winding segment WSc. In comparison to the first and second electric connecting sections VBa, VBb, this fourth electric connecting section VBd has a smaller, third expansion width 20c in accordance with the example. In accordance with the example, this relatively smaller and/or shorter third expansion width 20d is configured over a number-of-grooves crossover width of "8." Alternatively, this fourth electric connecting section VBd may also have a relatively larger and/or longer expansion width 20d. This occurs whenever the beginnings of the winding and ends of the winding of the respective part-windings TWa to TWc are selected different, in particular diametrically opposed. Here, such a shortened and/or extended, fourth electric connecting section VBd is configured exclusively if an integer number of fractional slots is larger than two and/or if three winding segments WSa, WSb and WSc serially-connected with one another are configured. In particular, it is expedient and/or characteristic that the number of the winding segments WSa, WSb, WSc, WSx is identical to the number of fractional slots q of the stator 1 and/or of the stator winding 14. Here, the number of fractional slots is to be understood to mean the number of the receiving grooves 4 per pole section 19a or 19b and per phase winding PW and/or per phase of the stator winding 14. Correspondingly, the number of fractional slots amounts to q=2 if there are two winding segments WSa, WSb. In another exemplary embodiment, the number of fractional slots may amount to q=4 and four winding segments WSa, WSb, WSc, WSd are configured here.

The relevant relationships may also be depicted as follows in the form of a table:

| Number of fractional slots q | Number of winding segments WSa to WSx per pole pair and per part-winding | Number of third electric connecting sections (VBc) per winding segment and per pole pair | Number of fourth electric connecting sections (VBd) per winding segment and per pole pair |
|---|---|---|---|
| 2 | 2 | 1 | — |
| 3 | 3 | at least 1 | 1 |
| 4 | 4 | 2 | at least 1 |
| 5 | 5 | at least 2 | 2 |
| 6 | 6 | 3 | at least 2 |

It must thus also be said that the at least one part-winding TWa of the stator winding 14 and/or of a phase winding PW comprises a first winding segment WSa, wherein the current path 17a defined by the first winding segment WSa either (i), starting from the radially-innermost layer L1 (side of the air gap) of conductor sections La, Lb, leads to the radially-outermost layer L8 (yoke side) of conductor sections La, Lb, or vice versa (ii), starting from the radially-outermost layer L8 (yoke side) of conductor sections La, Lb, leads to the radially-innermost layer L1 (side of the air gap) of conductor sections La, Lb, and is subsequently guided, without an offset in the layer L, i.e. without crossover and/or without a change in the layer L, by means of the third electric connecting section VBc, which may also be referred to as an extended and/or relatively longer connecting section, to the second winding segment WSb. The current path 17b in the second winding segment WSb is thereafter (i), starting from the radially-outermost layer L8 (yoke side) of conductor sections La, Lb, guided to the radially-innermost layer L1 (side of the air gap) of conductor sections La, Lb, or vice versa (ii), starting from the radially-innermost layer L1 (side of the air gap) of conductor sections La, Lb, guided to the radially-outermost layer L8 (yoke side) of conductor sections La, Lb.

In addition, it can be gathered from FIGS. 2 and 3, respectively, that the first winding segment WSa and the second winding segment WSb, starting from their respective beginnings of the winding 21 (A1) and 22 (A5), in a direction toward their respective ends of the winding 23 (A4) and 24 (A8), are respectively wound in the same direction, for example respectively clockwise. Alternatively, an anti-clockwise implementation running in the same direction and/or an implementation running respectively uniformly anti-clockwise would also be possible.

To form a desired stator winding 14 and/or phase winding PW, it may be expedient that any and all winding segments WSa, WSb, WSc, WSx of a multiply-segmented part-winding TWa to TWx are electrically connected in series and, starting from their respective beginning of the winding 21, 22, 25, in a direction toward their respective end of the winding 23, 24, 26, are respectively wound in the same direction, for example respectively wound and/or running clockwise.

As can most easily be seen from FIG. 2, the second part-winding TWb has a double-mirror-image structure and/or course relative to the first part-winding TWa. In this exemplary embodiment, the second part-winding TWb is laterally offset in a circumferential direction 10 by a single receiving groove 4 relative to the first part-winding TWa. There is thus a number-of-grooves crossover width of "one" between the part-windings TWa and TWb, which are physically arranged in parallel and interleaved with one another, as this can be seen from FIG. 2. Here, the imaginary first axis of symmetry is defined by the longitudinal axis 3 of the laminated core 2. The imaginary second axis of symmetry runs along the circumferential direction 10 of the laminated core 2. The first and the second part-winding TWa and TWb form a matching and/or corresponding pair of part-windings and extend across exactly one pole pair of the laminated core 2, in particular across two subsequent pole sections 19a and 19b.

A part-winding TWa, TWb, TWc and/or TWa to TWx may also be defined by the fact that the voltage induced by it, which is a vector quantity, is identical in value and phase to the induced voltages of the other part-windings within the phase winding PW. Accordingly, its matching conductors of the same receiving groove respectively take the different amplitudes of the induced voltages into account.

The stator winding 14 and/or its part-windings TWa to TWx may be constructed by forming-rod conductors and/or conductor sections La, Lb, which are configured as so-called hairpins—FIGS. 4a, FIG. 4b—or as so-called I-pins—FIG. 5. In a hairpin implementation in accordance with FIGS. 4a, 4b, respectively two conductor sections La, Lb which are immediately subsequent in the electric current paths 17a, 17b, 17c (FIG. 3) and respectively one first connecting section VBa respectively electrically connecting these conductor sections La, Lb are formed as one piece. Yet, as illustrated in FIG. 5, also so-called I-pins can be used, whose middle sections respectively constitute the conductor sections La, Lb and whose first end sections, which are formed and preferably welded with one another, define the first electric connecting section VBa. The second end sections of the conductor sections La, Lb, located opposite the first end sections, define the second connecting sections VBb for the electric connection to a further I-or hairpin to be serially connected. In accordance with FIG. 4a, the second connecting sections VBb may be formed such that they are aligned facing each other. Yet, in accordance with FIG. 4b, the second connecting sections VBb may also be formed such that they run parallel to each other and/or point in uniform directions.

The rectangles at the broad lines and/or in the middle section of the respective arrows depicted in FIG. 2 and in FIGS. 9, 10 marked with dotted hatching symbolize contact points, in particular welded points, between two second electric connecting sections VBb of electrically serially-connected, essentially congruently-positioned pairs of forming rods 16, as they are schematically illustrated in FIG. 4a. FIG. 2 and FIGS. 9, 10 thus show the use of hairpins and/or of one-piece, essentially U-shaped pairs of forming rods 16.

It may be expedient if each of the winding segments WSa, WSb and WSc and/or WSa to WSx extends across more than two, i.e. at least across three, immediately-adjacent receiving grooves 4 in terms of the circumferential direction 10 of the laminated core 2. The first and the second expansion widths 20a and 20b of the first and second electric connecting sections VBa and VBb are thus larger or equal to the three-fold transverse and/or lateral distance between two immediately-adjacent receiving grooves 4 of the laminated core 2. In the embodiment according to FIG. 2, the number-of-grooves crossover widths of the connecting sections VBa and VBb and/or of the immediately-subsequent conductor sections La and Lb amount to "nine," for example.

FIG. 6 illustrates an exemplary embodiment of a part-winding of a stator winding 14, for example a part-winding TWa. This basic structure repeats itself in a corresponding manner for the part-windings TWb to TWx. The depicted part-winding TWa is configured using forming-rod technique and comprises a plurality of electrically serially-connected hairpins. The winding diagram shown results in a number of fractional slots q=2, since the number of the immediately-subsequent receiving grooves 4 per magnetic pole and phase is "2." In comparison to this, the so-called number of fractional slots q=3 in the part-winding TWa according to FIG. 7. The winding segments WSa and WSb of the part-winding TWa according to FIG. 6 and also the winding segments WSa, WSb and WSc of the part-winding TWa according to FIG. 7 are respectively formed by loop windings 15 configured using forming-rod technique. The winding segments WSa and WSb (FIG. 6) and/or the winding segments WSa, WSb and WSc (FIG. 7) are respectively electrically connected in series.

As can most easily be seen from FIG. 7, the third winding segment WSc is arranged interleaved relative to the first winding segment WSa, in particular, for the most part, positioned super-imposing relative to the first winding segment WSa. Its winding axes WAa and WAc are staggered relative to each other in a circumferential direction 10 by a number of receiving grooves 4 corresponding to the number of fractional slots q-1, laterally offset by two receiving grooves 4 in accordance with the example.

According to an expedient measure as it can most easily be seen in FIGS. 6 and 7, it may also be provided to provide the first connecting sections VBa of the individual hairpins and/or pairs of forming rods 16 in their middle section with an essentially S- or Z-shaped forming section 28 in terms of a plane 27 running perpendicular to the longitudinal center axis of the laminated core. This ensures that the connecting sections VBa are shaped such that a crossover by "one" in terms of immediately-subsequent conduction sections La and Lb of a hairpin are implementable in an orderly manner The winding segments WSa, WSb and/or WSc respectively configured as loop windings 15 in FIGS. 6 and 7 are characterized, among other things, by the fact that these winding segments WSa, WSb and/or WSc are respectively formed by a plurality of pairs of forming rods 16 arranged in series along the winding axis WAa, WAb and/or WAc and electrically connected in series.

FIG. 8 shows how the part-winding TWa in accordance with FIG. 7 can be inserted in a laminated core 2 in order to thus form a partial component of a stator 1. Merely for the sake of better clarity, merely half of a stator 1 has been illustrated here. In accordance with the example, the laminated core 2 in accordance with FIG. 8 has a total of 72 receiving grooves 4 and is provided with eight magnetic poles for implementing a stator winding with a total of three phases.

FIG. 9 illustrates, among other things, the winding diagram of the part-winding TWa, which part-winding TWa is then depicted physically-implemented in FIGS. 7 and 8. FIGS. 7 and 8 illustrate, among other things, a part-winding TWa, which constitutes a partial component of a stator winding to be constructed.

The winding diagram shown in FIG. 9 is configured for provisioning four magnetic poles and designed for a laminated core 2 with 36 receiving grooves 4. It should be noted merely for the sake of completeness that the winding diagram in accordance with FIG. 9 shows only one single phase winding PW of a stator winding 14 to be produced. This phase winding PW comprises four part-windings TWa, TWb, TWc, TWd, which extend over a total of 360° of the circumferential direction 10 of a laminated core 2 with a total of 36 receiving grooves 4. These four part-windings TWa, TWb, TWc, TWd result in a four-pole stator winding 14, i.e. a stator 1 with a number of pole pairs of "two." The structure of the part-winding TWc is identical here to the structure of the part-winding TWa. This analogously applies to the part-windings TWb and TWd. The part-windings TWa and TWc and/or TWb and TWd, however, are arranged staggered relative to one another and/or spaced apart in terms of the circumferential direction 10. The extent of this lateral offset depends on the desired number of pole pairs and number of grooves of the stator 1 to be produced.

FIG. 10 shows another, and, if applicable, independent, embodiment of a stator winding 14, wherein, once again, equal parts are provided with the same reference numbers and/or the same component designations as in the preceding figures. To avoid unnecessary repetition, the detailed description in the preceding figures should be noted and/or is made reference to.

In particular, FIG. 10 shows a winding diagram for forming a chorded stator winding 14, wherein here, too, only one single phase winding PW of a three-phase, four-pole stator 1 is depicted. The winding diagram at issue can therefore also be used to form chorded stator windings 14 and/or chorded part-windings TWa to TWx.

To form chorded part-windings TWa, TWb, TWc, TWd, the first and second electric connecting sections VBa, VBb in each of their winding segments WS a, WSb, WSc have first expansion widths 20a and 20b between conductor sections La, Lb spaced apart from one another and electrically connected in series in a circumferential direction 10 which first expansion widths 20a and 20b are different to one another. In particular, in the exemplary embodiment shown, number-of-grooves crossover widths of 15 are provided in terms of the first connecting sections VBa, and number-of-grooves crossover widths of 13 are provided in terms of the second connecting sections VBb.

Here, it is also characteristic that the number of shortened or—as elucidated below—extended second connecting sections VBb in each of the part-windings TWa, TWb, TWc, TWd, which shortened and/or extended second connecting sections VBb are configured shorter and/or longer in comparison to the first connecting sections VBa, is identical to the number of fractional slots q of the stator 1. In particular, the number of shortened and/or extended second connecting sections VBb is identical to the number of the receiving grooves 4 per magnetic pole section 19a or 19b, per phase winding PW and per part-winding TWa, TWb, TWc or TWd.

It must be said that in a chorded stator winding 14 and/or in chorded part-windings TWa to TWx, the lateral offset and/or crossover in terms of the receiving grooves 4 can be set optionally. In FIG. 10, the cells marked with cross-hatching cross over to the "right," but they could also cross over to the "left." The cells colored in gray in FIG. 10 show stairs starting on the right. Yet, the chording of the part-windings TWa to TWx can alternatively also be done using an extended winding step. The cells marked with cross-hatching would then show stairs starting on the left. Therefore, as an alternative to the diagram according to FIG. 10, also extended connecting sections VBb are possible.

It should be said in summary that the winding diagram is characterized by the fact that one crossover is carried out per U-shaped pair of forming rods 16 and/or per hairpin and that a complete parallel branch and/or a complete part-winding TWa to TWx per phase winding PW covers at least one and/or exactly one pole pair 19a and 19b in a circumferential direction of the laminated core 2. In an unchorded stator winding 14, the U-shaped pairs of forming rods 16 in it have the same step width. The ends of the pairs of forming rods 16 radially connected in series and in a zigzag shape result in winding segments WSa to WSx which comprise, on the side of the air gap 5 or side of the groove base 7 (FIG. 1) and in the relevant uppermost and lowermost layer (layer facing the stator yoke and layer facing the air gap), at least one shortened and one extended winding step with a shortened expansion width 20d and/or extended expansion width 20c. In this case, the uppermost or also the lower layer may contain the shortened winding step or vice versa.

The winding diagram is therefore characterized by the fact that, upon implementing a chorded winding, accordingly-shortened winding steps with at least the same number as the number of fractional slots q occur. The number of fractional slots q is the number of the receiving grooves per phase, per magnetic pole of the winding and per part-winding.

The winding diagram is further characterized by the fact that the U-shaped pairs of forming rods (hairpins) and/or the current paths configured with them which pertain to a parallel branch (part-winding) and are interconnected in series lead at least from an outer (uppermost or lowermost) layer to the radially opposite innermost (lowermost or uppermost) layer—expediently in the zigzag shape mentioned above—then lead to the magnetic pole adjacent in a circumferential direction with a shortened or extended winding step, without a crossover, in order to lead, from there, once again, yet in the opposite direction, from the outer layer to the opposite layer.

The above-mentioned implementation with U-shaped pairs of forming rods 16 (hairpins) is equally feasible and/or implementable using I-shaped forming rods (I-pins).

An unchorded winding is to be understood, as a rule, to mean windings and/or coils in which the coil span which refers to the circumferential direction 10 of the laminated core 2 is equal to the pole pitch. Pole pitch is understood to mean the axial distance between subsequent magnetic poles. Coil span is to be understood to mean the previously-mentioned expansion widths 20a and 20b. In contrast to this, the coil span is smaller (or also larger) than the pole pitch in chorded windings and/or coils.

FIG. 11 shows another advantageous exemplary embodiment of the winding diagram. Here, equal reference numbers are used for parts already described hereinbefore, and the preceding parts of the description are analogously transferable to equal parts with equal reference numbers.

The advantageous technical effects of an embodiment according to FIG. 11 can here be clarified in comparison to the exemplary embodiment in accordance with FIG. 2. In the exemplary embodiment according to FIG. 2, the voltage difference ΔU (delta U) between two immediately-abutting, i.e. directly-adjacent, conductor sections La and/or Lb within a receiving groove 4 can amount to up to the full phase and/or outer conductor voltage UL1-L2 (FIG. 13—arrows depicted in dashed lines) if, for example, the part-windings TWa and TWb are electrically connected in parallel and form a winding phase of a delta-connected stator winding 14, as this is schematically shown in FIG. 13. In particular, in the embodiment according to FIG. 2, the entire phase and/or outer conductor voltage UL1-L2 is applied, for example, between the immediately-adjacent conductor sections La with the designation A1 and B12 in the receiving groove 4 with the number 1 (for the phase U). The same applies, for example, in terms of the directly-contiguous conductor sections La with the designation B1 and A12 in the receiving groove 4 with the number 3 for the electric phase U, as this can also be seen by means of a combination with FIG. 13 (arrows depicted in dashed lines). The insulation layer 9 at the lateral surfaces of the conductor sections La and/or Lb must thus be designed for this relatively high difference in electric potential as it occurs in the embodiment according to FIG. 2. For example, a correspondingly great thickness of the insulation layer 9—FIG. 1—at the lateral surfaces of the conductor sections La and/or Lb is to be provided.

In contrast to this, in the advantageous embodiment according to FIG. 11, the maximum voltage difference ΔU occurring between immediately-adjacent conductor sections La and/or Lb (see the upper section of FIG. 11) can be reduced and/or lowered considerably. In particular, in the embodiment according to FIG. 11, which, analogously to FIG. 2, relates to a two-pole stator 1 to be supplied using three phases and having a total of eight layers L1-L8, the maximum voltage difference ΔU occurring between immediately-adjacent conductor sections La or Lb can be reduced to about a third (approx. 33%) of the phase and/or outer conductor voltage UL1-L2—see, for example, the immediately-adjacent conductor sections La and/or Lb with the designation A1 and B4 in the receiving groove 4 with the number 1 (for the phase U) in FIG. 11 in combination with FIG. 13. In particular, this ensures that the physical stresses on the insulation layer 9 can be reduced and/or the requirements for the electro-technical insulation properties of the conductor sections La, Lb be advantageously lowered. This ultimately enables the thickness of the insulation layer to be reduced and consequently the space factor of electrically-conductive material in the receiving grooves 4 to be increased.

This advantageous reduction of the maximum difference in potential ΔU occurring between immediately-adjacent and/or gap-free, contiguous conductor sections La and/or Lb can be achieved by ensuring that a beginning of the winding 21a of the first part-winding TWa and a beginning of the winding 21b of another part-winding TWb, TWc, TWd, which is electrically connectable or connected in series or electrically connectable or connected in parallel to the first part-winding TWa, are positioned such that these beginnings of the winding 21a and 21b (FIGS. 11, 12) are arranged in receiving grooves 4 which belong to the same phase zone Pz. In this case, the receiving grooves 4 and/or all conductor sections La or Lb arranged therein which are allocated to the same phase U, V or W and belong to the same magnetic pole and/or pole section 19a or 19b of the stator 1 and are thus carrying current in the same direction in the operating mode of the stator 1, count among a phase zone Pz. In the depictions in FIGS. 2 and 9-12, the phase zones Pz for the phase U can be seen by the areas and/or receiving grooves 4 with cross-hatching.

It may also be expedient if a beginning of the winding 21a of the first part-winding TWa is positioned in the radially-innermost layer L1 and a beginning of the winding 21b of the other part-winding TWb, which is to be electrically connected in series or electrically in parallel with the first part-winding TWa, is positioned in the radially-outermost layer L8, as this is illustrated in FIGS. 11, 12. Yet, an inverse allocation is also possible, in which the beginning of the winding 21a is allocated to the radially-outermost layer L8 and the beginning of the winding 21b is allocated to the radially-innermost layer L1 of the stator winding 14. Therefore, the beginnings of the winding 21a, 21b are formed by two part-windings TWa, TWb to be electrically connected in series or electrically connected in parallel on the one hand in the radially-innermost layer L1 and on the other hand in the radially-outermost layer L8 of the stator winding 14.

Primarily whenever the part-windings TWa-TWx of the stator winding 14 are configured as unchorded windings (FIGS. 2, 3, 9, 11, 12), it may be expedient if a beginning of the winding 21a of the first part-winding TWa and a beginning of the winding 21b of another part-winding TWb-TWx, which is electrically connectable or connected in series or electrically connectable or connected in parallel to the first part-winding TWa, are positioned and/or arranged in the same receiving groove 4. As can be seen from FIG. 11 in accordance with the example, the beginning of the winding 21a of the part-winding TWa (A1) and the beginning of the winding 21b of the part-winding TWb (B1) are selected such that they are allocated to the same receiving groove 4, in accordance with the example are assigned to the groove with the number 1.

Analogously to the regime regarding the beginnings of the winding 21a, 21b a winding end 26a (A12) of the first part-winding TWa and a winding end 26b (B12) of another part-winding TWb-TWx connected in series or in parallel are thereafter positioned in the same, i.e. identical, receiving groove 4, as this can be seen in FIGS. 11 and 12 by means of the receiving groove 4 with the number 12 (for the phase U).

In terms of the exemplary embodiments in accordance with FIGS. 11 and FIG. 12, in which the maximum voltage difference ΔU occurring between immediately-adjacent conductor sections La and/or Lb is advantageously low, it is further characteristic that, in receiving grooves 4 with beginnings of the winding 21a, 21b configured there (see the fields A1, B1 and/or C1, D1), or with ends of the winding 26a, 26b configured there (see the fields A12, B12 and/or C12, D12), respectively only beginnings of the winding 21a, 21b (A1, B1; A1, D1; B1, C1) or respectively only ends of the winding 26a, 26b (A12, B12; C12, D12) are configured. Therefore, in the receiving grooves 4 in which power connections to the electric energy supply of the stator winding 14 are provided, either only beginnings of the winding 21a, 21b or only ends of the winding 26a, 26b are configured, as this can be seen in FIG. 11 and FIG. 12. In particular, a generically-identical sorting and/or grouping of the beginnings of the winding 21a, 21 and the ends of the winding 26a, 26b in terms of respectively-used receiving grooves 4 of the laminated core 2 is provided.

FIG. 12 shows a winding diagram and/or an embodiment of a stator 1 with four part-windings TWa-TWd and four magnetic poles, i.e. 2 pole pairs. The structural measures and/or rules described hereinbefore are analogously applicable to this embodiment. Also in this case, the respective beginnings of the winding 21b of the at least one other part-winding TWb-TWx within the phase zone Pz are selected such that a marked reduction of the electric differences in potential ΔU between two adjacent conductor sections within the respective receiving grooves 4 occurs. Depending on the winding diagram, this reduction of the voltage load on the insulation layer 9 may here amount to 50%, or more than 50%, in particular around 66%, as this can be gathered from FIG. 13.

According to a workable embodiment, also a mixed use of hairpins shown in an exemplary manner in FIG. 4 and of I-pins shown in an exemplary manner in FIG. 5 may be provided to construct the stator winding 14. In particular, it may be provided that the first and the last conductor section La, Lb of at least one of the part-windings TWa-TWx, in particular of all part-windings TWa-TWx of the stator winding 14, are respectively formed by an I-pin, in particular by I-shaped forming rods. All conductor sections La, Lb arranged in between, in contrast, are configured as electrically series-connected hairpins, in particular as U-shaped pairs of forming rods 16.

The winding diagram and/or the specified stator winding 14 presented and the stator 1 constructed on its basis have been described and illustrated in connection with an internal rotor and/or internal-rotor motor. Yet, this winding technology may also be applied for an internal stator and an external rotor (external-rotor motor).

The exemplary embodiments show possible embodiment variants, and it should be noted in this respect that the invention is not restricted to these particular depicted embodiment variants of it, but that rather also various combinations of the individual embodiment variants with one another are possible and this possibility of variants based on the technical teaching by means of the invention at issue lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Any and all specifications of value ranges in the description at issue are to be understood to comprise any and all sub-ranges of same, for example the specification 1 to 10 is to be understood to mean that any and all sub-ranges starting from the lower limit 1 and from the upper limit 10 are comprised therein, i.e. any and all sub-ranges start at a lower limit of 1 or larger and end at an upper limit of 10 or less, e.g. 1 to 1.7, or 3.2 to 8.1, or 5.5 to 10.

Finally, as a matter of form, it should be noted that for ease of understanding of the structure, elements are partially not depicted to scale and/or are enlarged and/or are reduced in size.

LIST OF REFERENCE NUMBERS 1 stator PW phase winding
2 laminated core TWa, TWb part-windings
3 longitudinal axis TWc, TWd part-windings
4 groove WSa first winding segment
5 air gap WSb second winding segment
6 tip of a tooth WSc third winding segment
7 groove base L layers
8 electric conductor La, Lb conductor sections
9 insulation layer VBa, VBb electric connecting sections
10 circumferential direction VBc, VBc electric connecting sections
11 longitudinal direction WAa first winding axis
12 radial direction WAb second winding axis
13a, 13b axial front ends WAc third winding axis
14 stator winding Pz phase zone
15 loop winding
16 pair of forming rods
17a, 17b current paths
17c current path
18a, 18b radial directions
19a, 19b pole sections
20b first expansion widths
20c second expansion width
20d third expansion width
21; 21a, 21b beginning of the winding
22 beginning of the winding
23 end of the winding
24 end of the winding
25 beginning of the winding
26; 26a, 26b end of the winding
27 plane
28 forming section

The invention claimed is:

1. A stator (1) for an electric machine, comprising:
an essentially hollow-cylindrical laminated core (2) having a first and a second axial front end (13a, 13b) and having multiple receiving grooves (4) arranged distributed along a circumferential direction (10) of the laminated core (2) and extending along a longitudinal axis (3) of the laminated core (2), multiple electric conductor sections (La, Lb) per receiving groove (4) formed by forming rods, which conductor sections (La, Lb) form a stator winding (14) by predetermined electric connections, which stator winding (14) has multiple immediately-adjacent layers (L) of conductor sections (La, Lb) in a radial direction to the longitudinal axis (3) of the laminated core (2), wherein the stator winding (14) comprises at least two electric part-windings (TWa, TWb, TWc, TWd) per phase winding (PW), which part-windings (TWa, TWb, TWc, TWd) are formed by multiple serially-connected conductor sections (La, Lb), wherein first and second electric connecting sections (VBa, VBb) between electrically serially-connected conductor sections (La, Lb) are allocated to the first and to the second axial front end (13a, 13b) of the laminated core (2), and wherein two serially-connected conductor sections (La, Lb) define a pair of forming rods (16), wherein the at least two electric part-windings (TWa, TWb, TWc, TWd) are respectively formed at least by one first and one second electrically series-connected winding segment (WSa, WSb), wherein conductor sections (La, Lb) of the first winding segment (WSa) are electrically interconnected by means of the first and second electric connecting sections (VBa, VBb) such that a helical current path (17a) is defined along a first radial direction (18a) to the longitudinal axis (3) of the laminated core (2) and conductor sections (La, Lb) of the second winding segment (WSb) are electrically interconnected by means of the first and second electric connecting sections (VBa, VBb) such that a second helical current path (17b) is defined along an opposite, second radial direction (18b) to the longitudinal axis (3) of the laminated core (2), wherein the current path (17a) defined by the first winding segment (WSa) either (i), starting from the radially-innermost layer (L1) of conductor sections (La, Lb), leads to the radially-outermost layer (L8) of conductor sections (La, Lb), or vice versa (ii), starting from the radially-outermost layer (L8) of conductor sections (La, Lb), leads to the radially-innermost layer (L1) of conductor sections (La, Lb), is subsequently guided, without an offset in the layer (L), by means of a third electric connecting section (VBc) to the second winding segment (WSb), and wherein the current path (17b) in the second winding segment (WSb) either (i), starting from the radially-outermost layer (L8) of conductor sections (La, Lb), is guided to the radially-innermost layer (L1) of conductor sections (La, Lb), or vice versa (ii), starting from the radially-innermost layer (L1) of conductor sections (La, Lb), is guided to the radially-outermost layer (L8) of conductor sections (La, Lb).

2. The stator according to claim 1, wherein the first and second winding segments (WSa and WSb) span two, in a circumferential direction (10) of the laminated core (2) immediately subsequent, magnetic pole sections (19a, 19b).

3. The stator according to claim 1, wherein the first winding segment (WSa) and the second winding segment (WSb) in terms of their helical current paths (17a, 17b) respectively have immediately-subsequent conductor sections (La, Lb), which immediately-subsequent conductor sections (La, Lb) are respectively arranged staggered relative to one another by a crossover with a crossover width of "one" in a radial direction to the longitudinal axis (3) of the laminated core (2).

4. The stator according to claim 1, wherein, to form unchorded part-windings (TWa, TWb, TWc, TWd), the first and second electric connecting sections (VBa, VBb) have identical first expansion widths (20a, 20b) per winding segment (WSa, WSb) between conductor sections (La, Lb) spaced apart from one another and electrically connected in series in a circumferential direction 10.

5. The stator according to claim 4, wherein, for electrically connecting the first winding segment (WSa) and the second winding segment (WSb), a third electric connecting section (VBc) is formed, which third electric connecting section (VBc) has a larger or smaller second expansion width (20c) in comparison to the first and second electric connecting sections (VBa, VBb).

6. The stator according to claim 1, wherein, to form chorded part-windings (TWa, TWb, TWc, TWd), first and second electric connecting sections (VBa, VBb) in each of their winding segments (WSa, WSb) have first expansion widths (20a and 20b) between conductor sections (La, Lb) spaced apart from one another and electrically connected in series in a circumferential direction (10) which first expansion widths (20a and 20b) are different from one another.

7. The stator according to claim 6, wherein the number of shortened or extended second connecting sections (VBb) in each of the part-windings (TWa, TWb, TWc, TWd), which shortened or extended second connecting sections (VBb) are configured shorter or longer in comparison the first connecting sections (VBa), is identical to the number of fractional slots q of the stator.

8. The stator according to claim 1, wherein a third winding segment (WSc) is provided which is electrically connected in series to the second winding segment (WSb) and, for the most part, is superimposed on the first winding segment (WSa).

9. The stator according to claim 8, wherein, to electrically connect the second winding segment (WSb) and the third winding segment (WSc), a fourth electric connecting section (VBd) is formed, which fourth electric connecting section (VBd) has a smaller or larger third expansion width (20d) in comparison to the first and second electric connecting sections (VBa, VBb).

10. The stator according to claim 9, wherein a shortened or enlarged fourth electric connecting section (VBd) is configured exclusively if an integer number of fractional slots q is larger than two.

11. The stator according to claim 1, wherein the number of the winding segments (WSa, WSb, WSc) is identical to the number of fractional slots q of the stator (1).

12. The stator according to claim 1, wherein the current path (17a) defined by the first winding segment (WSa) either (i), starting from the radially-innermost layer (L1) of conductor sections (La, Lb), leads to the radially-outermost layer (L8) of conductor sections (La, Lb), or vice versa (ii), starting from the radially-outermost layer (L8) of conductor sections (La, Lb), leads to the radially-innermost layer (L1) of conductor sections (La, Lb), is subsequently guided, without crossover and/or without a change in the layer (L), by means of the third electric connecting section (VBc) to the second winding segment (WSb).

13. The stator according to claim 1, wherein respectively two, in the electric current paths (17a, 17b) immediately-subsequent, conductor sections (La, Lb) and respectively one first connecting section (VBa) respectively electrically connecting these conductor sections are formed as one piece.

14. The stator according to claim 13, wherein the first connecting section (VBa), in its middle section, has an essentially S- or Z-shaped forming section (28) in terms of a plane (27) running perpendicular to the longitudinal center axis (2) of the laminated core (3).

15. The stator according to claim 1, wherein each of the receiving grooves (4) of the laminated core (2) is completely filled in terms of the radial direction to the longitudinal axis (3) of the laminated core (2) by conductor sections (La, Lb) of exactly two part-windings (TWa, TWb; TWc, TWd) arranged in parallel.

16. The stator according to claim 1, wherein the first winding segment (WSa) and the second winding segment (WSb), starting from their respective beginnings of the winding (21, 22), in a direction toward their respective ends of the winding (23, 24), are respectively wound in the same direction.

17. The stator according to claim 1, wherein all winding segments (WSa, WSb, WSc) of a multiply-segmented part-winding (TWa, TWb, TWc, TWc) are electrically connected in series and, starting from their respective beginnings of the winding (21, 22, 25), in a direction toward their respective ends of the winding (23, 24, 26), are respectively wound in the same direction.

18. The stator according to claim 1, wherein a beginning of the winding (21a) of the first part-winding (TWa) and a beginning of the winding (21b) of another part-winding (TWb, TWc, TWd), which is electrically connected or connectable in series or electrically connected or connectable in parallel to the first part-winding (TWa), are positioned such that their beginnings of the winding (21a, 21b) are arranged in receiving grooves (4) which belong to the same phase zone (Pz).

19. The stator according to claim 1, wherein a beginning of the winding (21a) of the first part-winding (TWa) and a beginning of the winding (21b) of another part-winding (TWb, TWc, TWd), which is electrically connected or connectable in series or electrically connected or connectable in parallel to the first part-winding (TWa), are positioned in the same receiving groove (4).

20. The stator according to claim 18, wherein, in terms of receiving grooves (4) with beginnings of the winding (21a, 21b; A1, B1, C1, D1) configured there or ends of the winding (26a, 26b; A12, B12, C12, D12) configured there, respectively only beginnings of the winding (21a, 21b; A1, B1; A1, D1; B1, C1) or respectively only ends of the winding (26a, 26b; A12, B12; C12, D12) are configured.

21. The stator according to claim 1, wherein the first and the last conductor section (La, Lb) of at least one of the part-windings (TWa, TWb, TWc, TWd) is formed respectively by an I-pin, and all conductor sections (La, Lb) arranged in between are configured as electrically series-connected hairpins.

22. An electric machine, comprising the stator according to claim 1.

23. The stator according to claim 6, wherein the number of shortened or extended second connecting sections (VBb) in each of the part-windings (TWa, TWb, TWc, TWd), which shortened or extended second connecting sections (VBb) are configured shorter or longer in comparison the first connecting sections (VBa), is identical to the number of the receiving grooves (4) per magnetic pole section (19a or 19b), per phase winding (PW) and per part-winding (TWa, TWb, TWc, TWd).

24. The stator according to claim 1, wherein a third winding segment (WSc) is provided which is electrically connected in series to the second winding segment (WSb) and, for the most part, is superimposed on the first winding segment (WSa), by laterally offsetting a third winding axis (WAc) of the third winding segment (WSc) by at least one to a maximum of six immediately-subsequent receiving grooves (4) in a circumferential direction (10) of the laminated core (2) relative to a first winding axis (WAa) of the first winding segment (WSa).

25. The stator according to claim 11, wherein the number of the winding segments (WSa, WSb, WSc) is identical to the number of the receiving grooves (4) per magnetic pole section (19a or 19b), per phase winding (PW) and per part-winding (TWa, TWb, TWc, TWd).

26. The stator according to claim 1, wherein respectively two, in the electric current paths (17a, 17b) immediately-subsequent, conductor sections (La, Lb) and respectively one first connecting section (VBa) respectively electrically connecting these conductor sections are formed as one piece by a so-called hairpin.

27. The stator according to claim 1, wherein the first and the last conductor section (La, Lb) of at least one of the part-windings (TWa, TWb, TWc, TWd) is formed respectively by I-shaped forming rods, and all conductor sections (La, Lb) arranged in between are configured as electrically series-connected U-shaped pairs of forming rods (16).

* * * * *